US011273341B2

(12) United States Patent
Barr

(10) Patent No.: US 11,273,341 B2
(45) Date of Patent: Mar. 15, 2022

(54) INTERACTIVE VISUALIZATION SYSTEM FOR BIOMECHANICAL ASSESSMENT

(71) Applicant: Ready 2 Perform Technology LLC, Calabasas, CA (US)

(72) Inventor: Andrew Barr, Calabasas, CA (US)

(73) Assignee: Ready 2 Perform Technology LLC, Calabasas, CA (US)

( * ) Notice: Subject to any disclaimer, the term of this patent is extended or adjusted under 35 U.S.C. 154(b) by 217 days.

(21) Appl. No.: 16/698,863

(22) Filed: Nov. 27, 2019

(65) Prior Publication Data

US 2021/0154529 A1    May 27, 2021

(51) Int. Cl.
| | |
|---|---|
| *G06F 3/01* | (2006.01) |
| *A63B 24/00* | (2006.01) |
| *G06T 19/00* | (2011.01) |
| *G06T 13/40* | (2011.01) |
| *G09B 19/00* | (2006.01) |
| *G06F 3/00* | (2006.01) |

(52) U.S. Cl.
CPC .......... *A63B 24/0006* (2013.01); *G06F 3/011* (2013.01); *G06F 3/016* (2013.01); *G06F 3/017* (2013.01); *G06T 13/40* (2013.01); *G06T 19/006* (2013.01); *G09B 19/0038* (2013.01); *A63B 2024/0015* (2013.01); *G06T 2207/30204* (2013.01); *G06T 2207/30221* (2013.01)

(58) Field of Classification Search
CPC ........ G06F 3/0482; G06F 3/011; G06F 3/017; G06F 3/016; A63B 24/0006; G06T 13/40; G06T 19/006
See application file for complete search history.

(56) References Cited

U.S. PATENT DOCUMENTS

| 7,119,819 | B1 * | 10/2006 | Robertson | G06F 3/04815 715/782 |
| 7,542,040 | B2 * | 6/2009 | Templeman | G06F 3/011 345/474 |
| 8,503,086 | B2 * | 8/2013 | French | A63F 13/213 359/630 |
| 9,696,795 | B2 * | 7/2017 | Marcolina | G06T 19/006 |
| 9,996,797 | B1 * | 6/2018 | Holz | G06F 3/0426 |
| 10,282,914 | B1 * | 5/2019 | Tran | G01G 19/44 |

(Continued)

*Primary Examiner* — Nicholas Augustine
(74) *Attorney, Agent, or Firm* — Patent Ingenuity, P.C.; Samuel K. Simpson

(57) ABSTRACT

An interactive visualization system has a receiver that receives image data corresponding to one or more biomechanical movements of a user. Further, the interactive visualization system has a processor that performs a biomechanical analysis, via a biomechanical rules engine, of the image data to determine that the one or more biomechanical movements of the user lack compliance with one or more biomechanical rules. The processor generates a virtual sports feedback cue to be rendered, in at least substantially real-time, via a virtual sports performance expert during performance of the one or more biomechanical movements of the user. Finally, the interactive visualization system has a transmitter that transmits the virtual sports feedback cue to the biomechanical data ingestion apparatus so that a rendering apparatus renders the virtual sports performance expert performing the virtual sports feedback cue in a manner visible to the user during the one or more biomechanical movements.

20 Claims, 15 Drawing Sheets

(56) References Cited

U.S. PATENT DOCUMENTS

| | | | | |
|---|---|---|---|---|
| 2015/0037771 | A1* | 2/2015 | Kaleal, III | A61B 5/486 |
| | | | | 434/257 |
| 2015/0099252 | A1* | 4/2015 | Anderson | G06T 7/0014 |
| | | | | 434/257 |
| 2015/0338915 | A1* | 11/2015 | Publicover | G06F 21/316 |
| | | | | 345/633 |
| 2017/0061817 | A1* | 3/2017 | Mettler May | G09B 19/003 |
| 2017/0123487 | A1* | 5/2017 | Hazra | G06F 3/017 |
| 2017/0123492 | A1* | 5/2017 | Marggraff | H04N 5/247 |
| 2017/0185261 | A1* | 6/2017 | Perez | G06F 3/04815 |
| 2018/0131907 | A1* | 5/2018 | Schmirler | G06T 19/006 |
| 2018/0369637 | A1* | 12/2018 | Hoang | G09B 19/0038 |

* cited by examiner

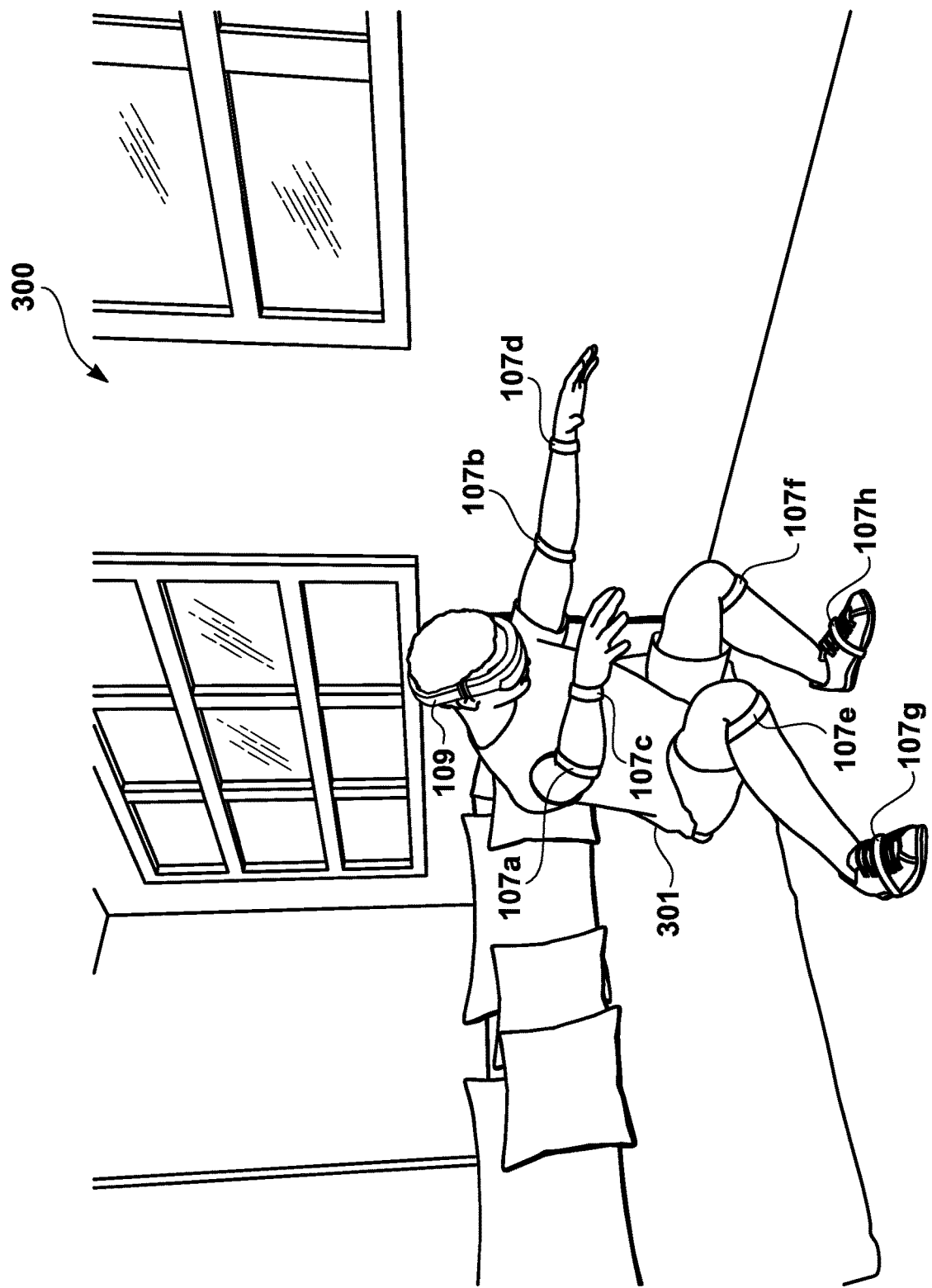

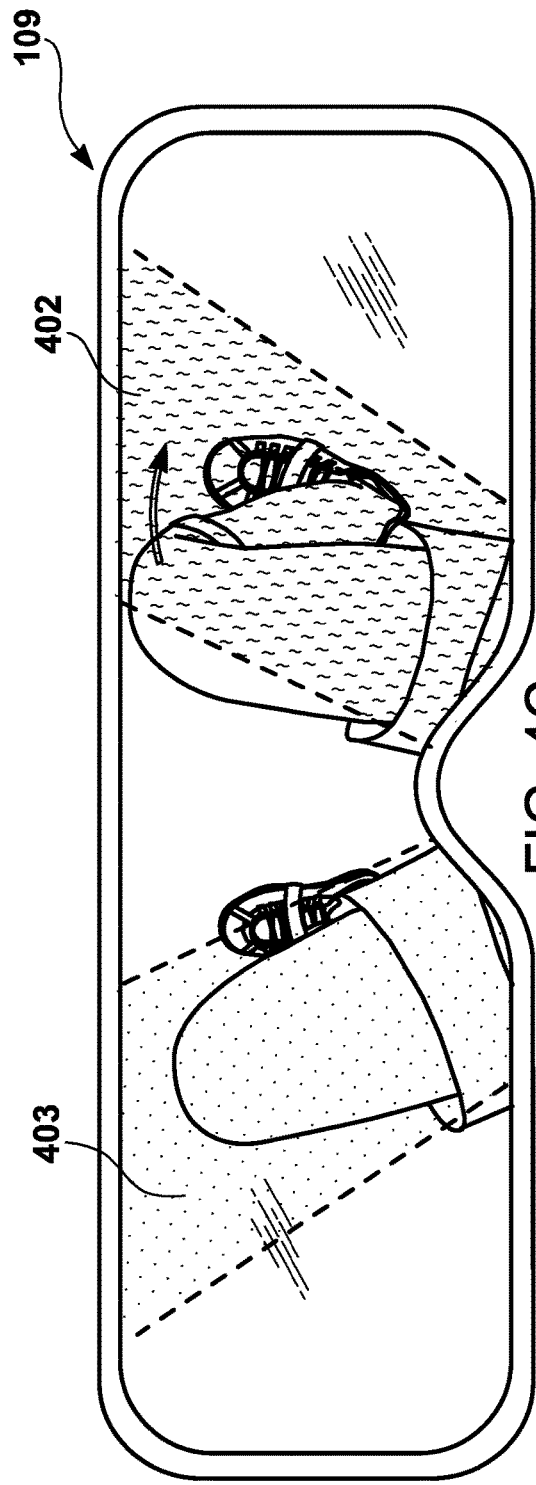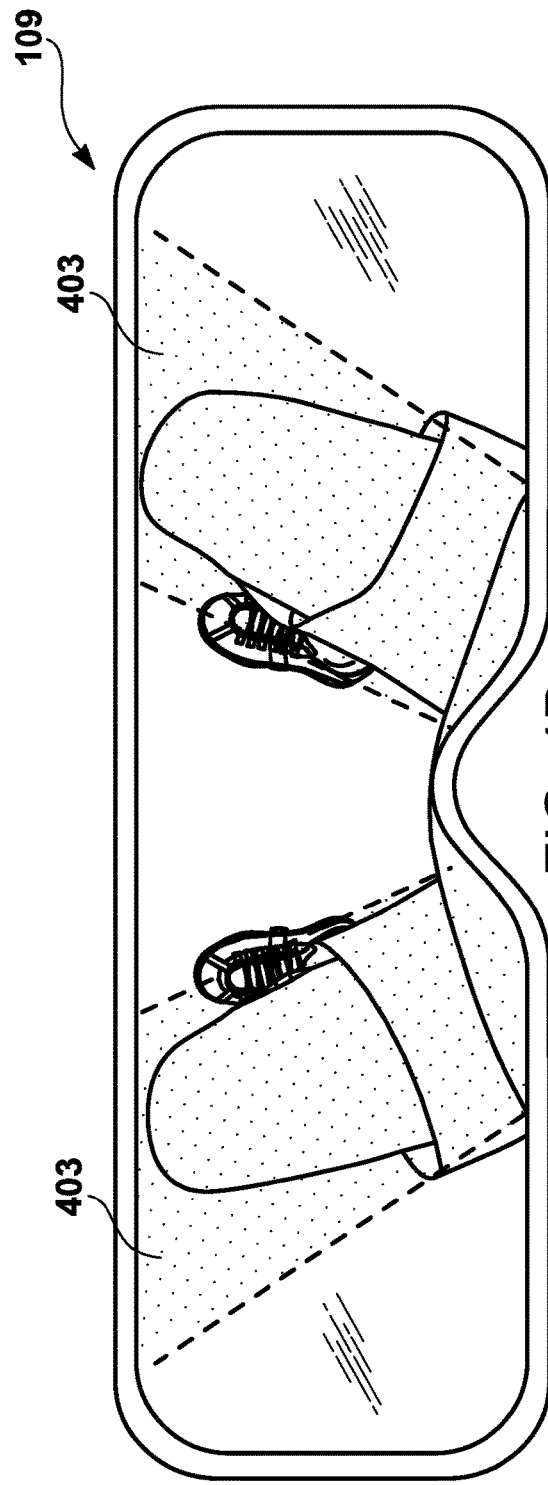

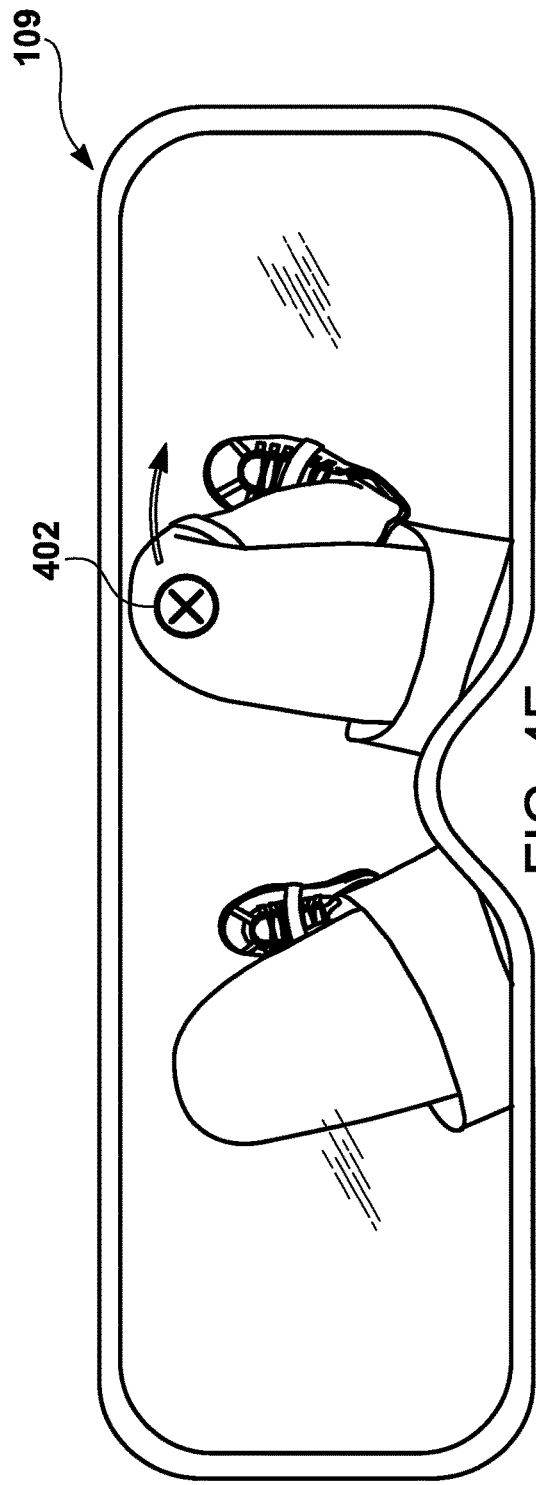
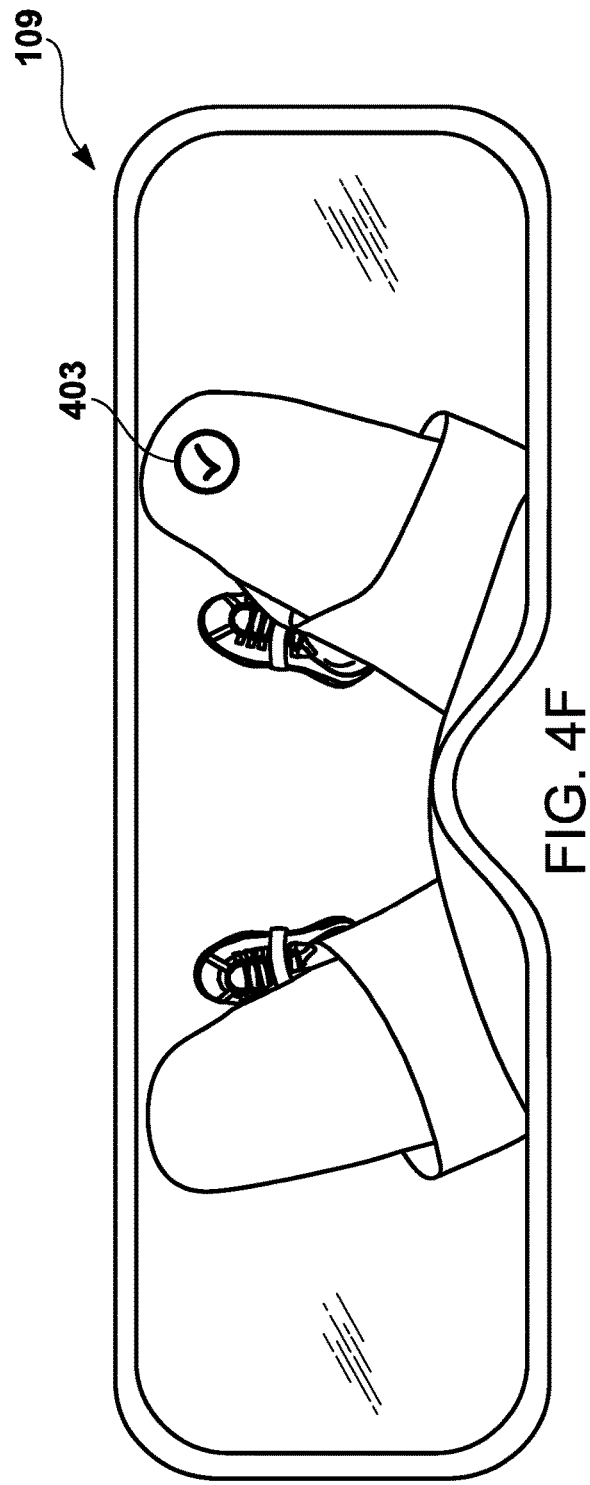

INTERACTIVE VISUALIZATION SYSTEM FOR BIOMECHANICAL ASSESSMENT

BACKGROUND

1. Field

This disclosure generally relates to computing systems. More particularly, the disclosure relates to the field of biomechanical visualization systems.

2. General Background

Sports performance experts (e.g., coaches, trainers, etc.) often attempt to work with athletes to maximize athletic performance for a particular athlete in a specific sport, preempt potential sports-related injuries, and/or rehabilitate the athlete from existing injuries. A common approach is for the sports performance expert to provide an in-person physical assessment of the athlete; yet, such an assessment is often inaccurate. Specifically, the sports performance expert is left guessing various metrics (e.g., fatigue, force production, angular joint articulation) generated by the athlete through various exercises, and then attempts to improve the performance of the athlete based on those estimated metrics. In essence, the sports performance expert performs a subjective assessment, which may not take into account invisible metrics (e.g., fatigue) or metrics that are difficult for a human to capture (e.g., joint articulation angles) with any degree of precision and/or consistency. As a result, the analysis performed by a sports performance expert may be quite subjective, and prone to error.

To alleviate such subjectivity, sports performance experts may employ various types of equipment to measure biomechanical data in a quantitative, rather than qualitative, manner. However, managing data outputted by such equipment is often quite difficult because of the large amount of biomechanical data that may be generated by such equipment. For example, that data has to be analyzed to then generate training reports based on the analysis. To perform the analysis and generate the reports may often take weeks, or possibly even months; such a time delay is often too significant to help minimize injury risk factors that may affect a player in the interim period. Furthermore, even after the foregoing time delay, the resulting report may be error prone because of a misinterpretation of the biomechanical data by the sports performance expert analyzing the biomechanical data during the analysis phase. Accordingly, the performance enhancing, injury prevention, and/or injury rehabilitation exercises prescribed in a report, generated from use of conventional equipment, may lack specificity with respect to the actual biomechanical issue that actually needs to be addressed.

Given the lack of a systematic approach to evaluating biomechanical data, both conventional qualitative and quantitative approaches to sports performance enhancement pose significant concerns. Furthermore, many athletes (e.g., non-professionals such as children) do not have access to a sports performance expert and/or sports performance equipment, leaving many athletes susceptible to significant risk of injury.

SUMMARY

In one embodiment, an interactive visualization system has a receiver that receives, through a network from a biomechanical data ingestion apparatus, image data corresponding to one or more biomechanical movements of a user. The receiver is remotely situated from the biomechanical ingestion apparatus. Further, the interactive visualization system has a processor, in operable communication with the receiver, that performs a biomechanical analysis, via a biomechanical rules engine, of the image data to determine that the one or more biomechanical movements of the user lack compliance with one or more biomechanical rules. The processor generates a virtual sports feedback cue to be rendered, in at least substantially real-time, via a virtual sports performance expert during performance of the one or more biomechanical movements of the user. Finally, the interactive visualization system has a transmitter, in operable communication with the processor, that transmits the virtual sports feedback cue to the biomechanical data ingestion apparatus so that a rendering apparatus renders the virtual sports performance expert performing the virtual sports feedback cue in a manner visible to the user during the one or more biomechanical movements.

In another embodiment, an interactive visualization system has an image capture device that captures image data corresponding to one or more biomechanical movements of a user. Furthermore, the interactive visualization system has a processor that generates a virtual sports performance expert. The processor also generates a virtual sports feedback cue performed by the virtual sports performance expert based on a determination that the one or more biomechanical movements of the user lack compliance with one or more biomechanical rules. Additionally, the interactive visualization system has a rendering apparatus that renders, in at least substantially real-time, the virtual sports performance expert performing the virtual sports feedback cue in a manner visible to the user during the one or more biomechanical movements.

As an alternative, a computer program may have a computer readable storage device with a computer readable program stored thereon that implements the functionality of the aforementioned interactive visualization systems. As yet another alternative, a process that utilizes a processor may implement the functionality of the aforementioned interactive visualization systems.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 3C illustrates the user repositioning his or her head to view the real-world misalignment/imbalance indicated by the virtual and/or audible cue presented by the virtual sports performance expert.

FIG. 4C illustrates the gaze of the user looking downward through the AR HMD toward his or her right knee to view the misalignment pointed out by the virtual sports performance expert.

FIG. 4D illustrates a biomechanical non-compliant indicator that may change to a biomechanical compliant indicator upon the user correcting his or her anatomical structure to take into account the virtual feedback of the virtual sports performance expert.

FIG. 4E illustrates an example of the biomechanical non-compliant indicator 402 being a circle that may or may not have associated imagery to indicate non-compliance.

FIG. 4F illustrates an example of the biomechanical compliant indicator being a circle that may or may not have associated imagery to indicate compliance.

DETAILED DESCRIPTION

Figure 1A:
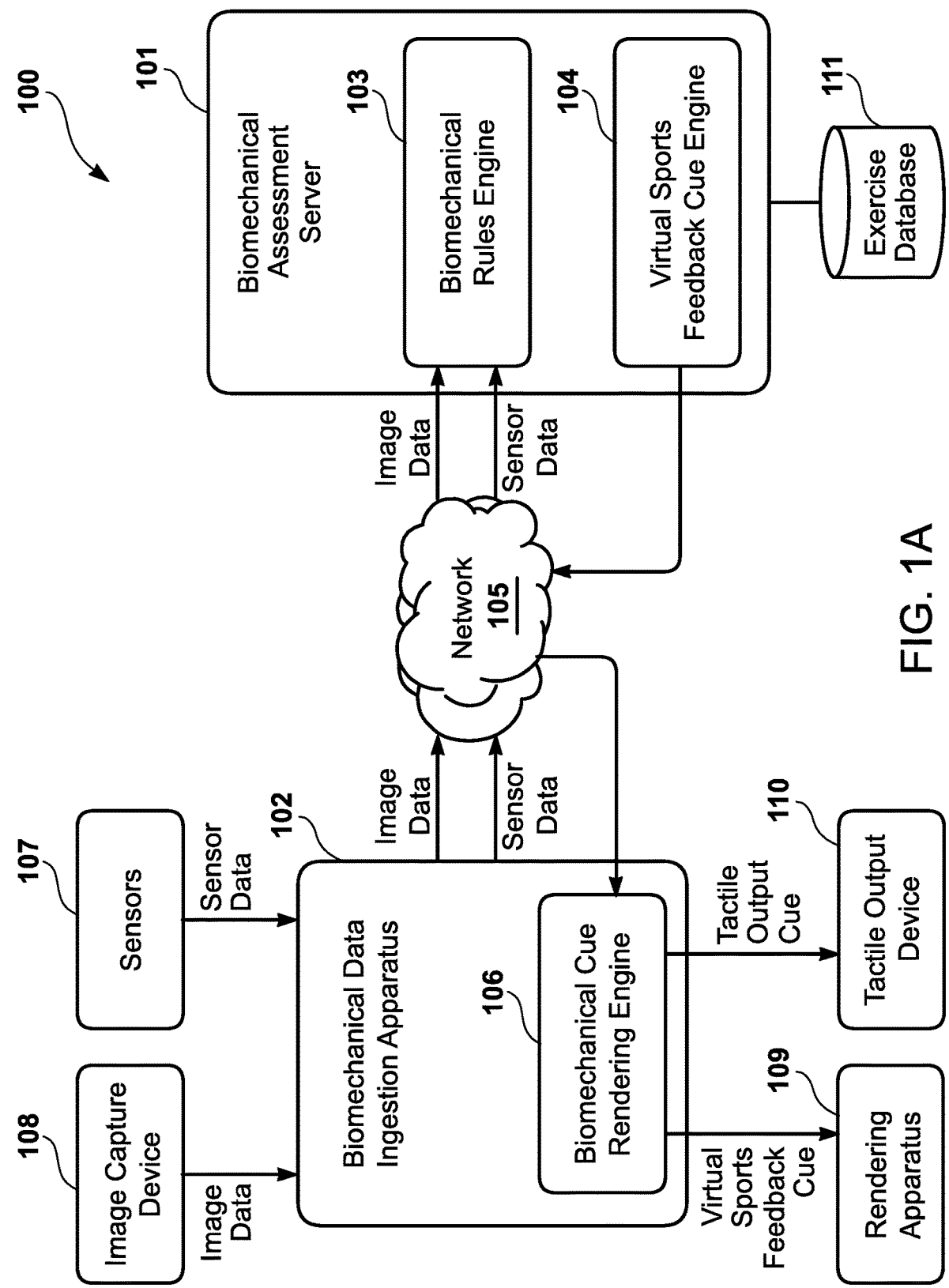
FIG. 1A illustrates a cloud-based configuration of the interactive visualization system.

An interactive visualization system is provided to generate a biomechanical assessment for a user, spanning a wide variety of types of athletes (casual to professional, children to adults, solo sports to team sports, etc.). Rather than necessitating an in-person sports performance expert and a sports performance lab with extensive equipment, the interactive visualization system may be implemented in a physical environment that is convenient for the user, such as a living room. Furthermore, the interactive visualization system generates biomechanical feedback to the user within real-time (i.e., a humanly imperceptible time difference between the time of the user's biomechanical movement and the time of the feedback), or substantial real-time (i.e., a humanly perceptible time difference between the time of the user's biomechanical movement and the time of the feedback that falls within an insignificant time delay threshold, which may be predetermined). The biomechanical feedback may be provided via a virtual sports performance expert (e.g., AR overlay, hologram, avatar, etc.). Accordingly, while the user is performing a particular athletic movement (exercise, sport-specific movement, sport-specific drill, yoga pose, etc.) in a physical environment, the interactive visualization system generates one or cues via the virtual representation of the sports performance expert so that the user may make biomechanical adjustments (e.g., proper alignment of limbs, spinal adjustments, etc.) in real-time, or substantial real-time, of performance of the athletic movement. Rather than having to travel to, and incur costs for, a performance lab, the user may obtain the benefit of having a sports performance expert coach him or her in the convenience of his or her own living room. Moreover, instead of waiting a prolonged period of time for data obtained from sports lab equipment in conventional configurations to measure and analyze data, the interactive visualization system presents cues to the user in real-time, or substantially real-time, so that the user may immediately make biomechanical corrections when it matters most to maximize performance and/or prevent injury: during performance of the athletic movement.

Furthermore, the interactive visualization system is implemented with various componentry (e.g., sensors) that are positioned to allow for increased levels of accuracy in biomechanical assessment, not feasibly possible by humans subjectively monitoring biomechanical movement or conventional equipment that is focused solely on outputting large amounts of data for subsequent analysis. The specific positioning of sensors in the interactive visualization system allows for real-time, or substantially real-time, measurements of specific joints motions and forces, as well as real-time, or substantially real-time, analysis of such motions or forces to determine compliance with one or more biomechanical rules. Given the fast, split-second movements of the anatomical structures of an athlete, a human sports performance expert could not possibly capture all of the movements and motions of the user to determine compliance with biomechanical rules. Whereas a human sports performance expert might catch the egregious large motor movements (e.g., significantly exceeding tolerable angles of joint motion), he or she is unlikely to catch the more subtle large motor movements (e.g., only slightly exceeding tolerable angles of joint motion) or fine motor movements, which may be humanly imperceptible to the human sports performance expert. Yet, such subtle deviations may potentially lead to significant wear-and-tear on a joint, and eventual injury. By constantly capturing and analyzing data for even subtle variations, the interactive visualization system is better able to maximize athletic performance and reduce athletic injury than current configurations.

In essence, the interactive visualization system awaits for a failure of a particular biomechanical movement and/or anatomical structure to meet the biomechanical rules, and then generates an instruction for the virtual sports performance expert to provide one or more virtual cues to the user on how to correct biomechanical and/or anatomical failure. Furthermore, the interactive visualization system may generate one or more virtual cues indicating that the user has complied with the biomechanical rules after a lack of compliance, or possibly without any failure. Additionally, or in the alternative, the interactive visualization system may generate one or more tactile cues (e.g., haptic feedback vibrations) emitted by one or more tactile feedback devices positioned on the user.

In one embodiment, the biomechanical rules may be predetermined, prior to the user athletic activity, to be applicable to all users. For example, a particular joint angle in a knee may be a predetermined threshold for performing squats, irrespective of the size of the user. In an alternative embodiment, the biomechanical rules may be determined on-the-fly based on customized parameters. For example, the interactive visualization system may calibrate the biomechanical rules prior to, or during, the user activity based on the specific anatomical structure and/or biomechanical motions of the particular user performing the athletic activity. For example, the interactive visualization system may capture imagery of the user to determine a biomechanical threshold that is permissible for a knee joint angle for one user with certain limb dimensions (e.g., thigh length, calf length, trunk length, etc.), which may be different to that of another user.

Finally, the interactive visualization system does not rely on human availability of a sports performance expert. Instead of having to wait for a prolonged period of time (e.g., days or weeks) to schedule an appointment with a human sports performance expert, the user can utilize the interactive visualization system can invoke a virtual sports performance expert at any time of the day and any day of the week. In other words, the virtual sports performance expert is not tied to the schedule of a particular human being because it may be generated and operated independently of a human virtual sports performance expert.

Figure 1B:
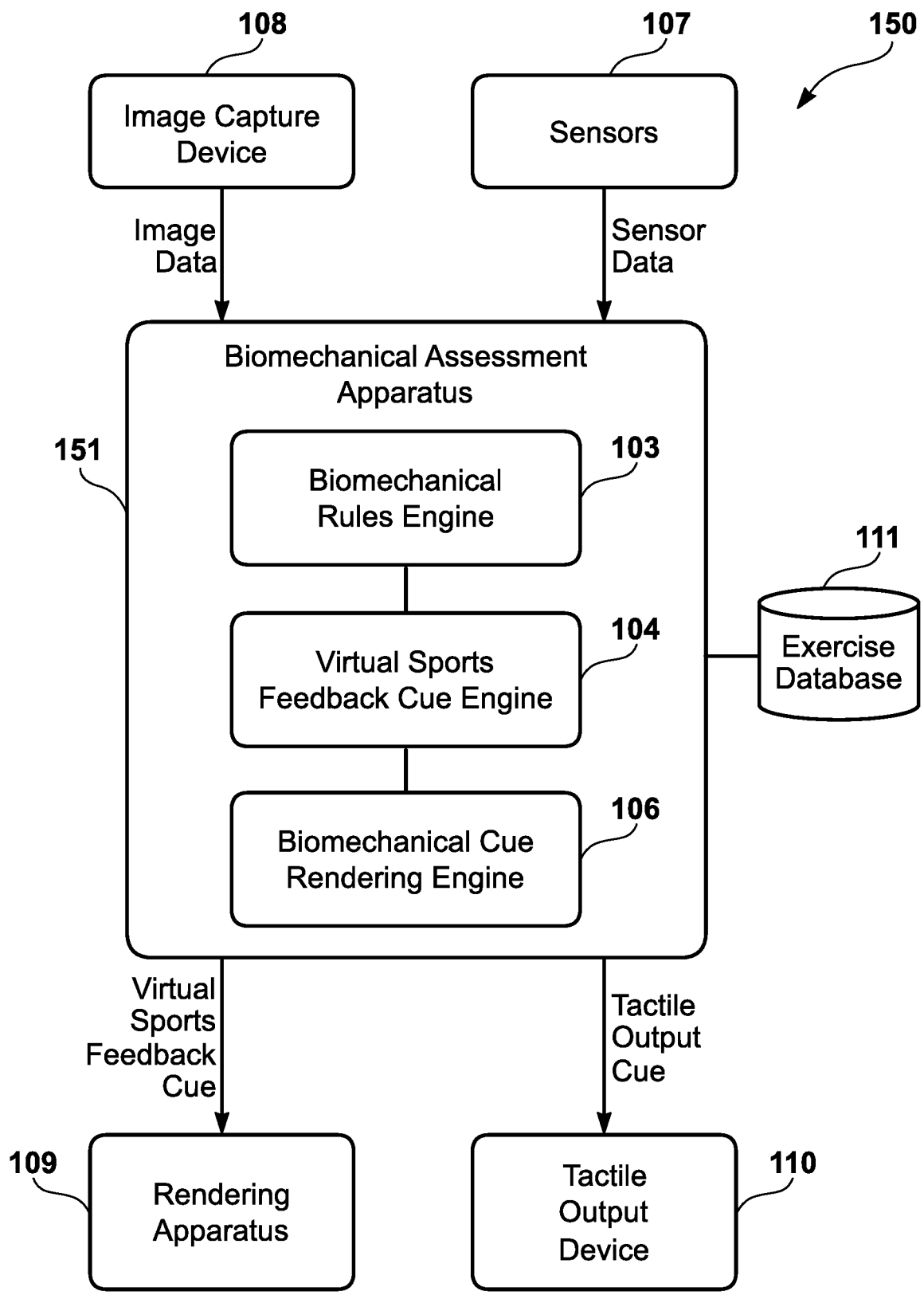
FIG. 1B illustrates localized configuration of the interactive visualization system.

FIGS. 1A and 1B illustrate various configurations for an interactive visualization system 100. In particular, FIG. 1A illustrates a cloud-based configuration of the interactive visualization system 100. By establishing one or more biomechanical rules, via a biomechanical rules engine 103, a biomechanical assessment server 101 may determine parameters which may activate one or more virtual sports feedback cues, generated by a virtual sports feedback cue engine 104, to be performed by a virtual sports performance expert. For example, various physical exercises may have associated metrics (e.g., joint angles, force production values, etc.) which are deemed to be within, or outside of, peak performance and/or safety levels. Upon receiving data from remotely situated devices, via a network 105, the biomechanical rules engine 103 may determine if an exercise, or other athletic movement, is being performed according to the one or more biomechanical rules. If a particular position of an anatomical structure of a limb of a user at any time deviates from the tolerance threshold indicated by the one or more biomechanical rules, the biomechanical rules engine 103 may provide an activation instruction, for that data point or set of data points, to the virtual sports feedback cue engine 104 to generate a virtual sports feedback cue (e.g., a finger pointing to the limb that is out of position, an audible direction to fix the position, etc.) from a virtual sports performance expert.

The biomechanical assessment server 101 receives the data to be analyzed from a biomechanical data ingestion apparatus 102, which is remotely situated from the biomechanical assessment server 101. For example, the biomechanical data ingestion apparatus 102 may be a set-top box (e.g., DVD player, streaming device, etc.) situated in the home of a user. The biomechanical data ingestion apparatus 102 may receive various data pertaining to a user. For example, the biomechanical data ingestion apparatus 102 may receive image data of the user performing an exercise, or other athletic movement, from one or more image capture devices 108 (e.g., cameras), which may be distinctly positioned within the same physical environment or integrated within the biomechanical data ingestion apparatus 102. Subsequently, the biomechanical data ingestion apparatus 102 may then send the image data to the biomechanical rules engine 103, via the network 105, so that the biomechanical rules engine 103 may perform an image analysis (e.g., on a frame-by-frame basis) of the image data to determine compliance, or lack of compliance, of the user's performance of the particular exercise, or athletic movement with the one or more biomechanical rules. For example, the biomechanical rules engine 103 may compare positions and/or articulations of various anatomical structures of a user (e.g., limbs, joints, spine, etc.) with tolerance thresholds indicated by the biomechanical rules. If one or more anatomical structures are not compliant with the biomechanical rules at any time during the performance of the exercise, or other athletic movement (e.g., yoga pose), the biomechanical rules engine 103 may activate the virtual sports feedback cue engine 104. For example, the user may temporarily move his or her knee out of proper alignment during performance of an exercise—even for a slight time period that would likely go undetected by a human observer. The biomechanical rules engine 103 may then activate an alert cue to the virtual sports feedback cue engine 104 to have the virtual sports performance expert inform the user that he or she should be careful about slight movements that violate the biomechanical rules.

The biomechanical data ingestion apparatus 102 may also, or alternatively, receive sensed data of the user performing an exercise, or other athletic movement, from one or more sensors 107 (e.g., biometric sensor, inertial measurement unit, thermometer, etc.). Furthermore, the one or more sensors 107 may be positioned directly on the user to perform various measurements during the user's performance of the exercise. As one example, the one or more sensors 107 may be biometric sensors that generate measurements of vital signs (e.g., heart rate, blood pressure, etc.) particular to the user. The biomechanical rules engine 103 may determine that one or more vital sign measurements are indicative of biomechanical movement that needs correction. For instance, the biomechanical rules engine 103 may establish a biomechanical rule indicative of fatigue (e.g., a heart rate below a predetermined threshold). As another example, the one or more sensors 107 may be inertial measurement units (e.g., accelerometers, gyroscopes, magnetometers) that determine one or more measurements indicative of a particular athletic movement that does not comply with the one or more biomechanical rules. For example, a particular position of an anatomical structure (e.g., limb) outside of a predefined range of motion may itself not be enough to violate a biomechanical rule, but a movement of that anatomical structure outside of that predefined range at an acceleration that exceeds a predetermined permissible acceleration may be violate the one or more biomechanical rules. Accordingly, the one or more sensors 107 may sense/measure a variety of metrics (e.g., velocity, acceleration, force, heat, etc.).

In another embodiment, an integrated sensor may be used in place of distinct sensors 107 and image capture devices 108. For example, a depth/heat sensing (e.g., thermal imaging) camera may be utilized to capture imagery to detect heartrate and/or body heat. A user may stand still in front of the depth/heat sensing camera before the assessment is initiated to generate baseline user data. The depth/heat sensing camera detects if the user's resting heartrate, or heartrate variability, has changed during the performance of the exercise, or other athletic movement. For example, an increased resting pulse or reduced pulse variability may indicate signs of fatigue, warranting a break for a period of time. As another example, increased areas of heat in specific joints compared to the baseline data, or data from previous exercise sessions of comparable intensity, may indicate joint inflammation, warranting a different training regimen, which emphasizes uninflamed joints, for that particular training session.

The biomechanical data ingestion apparatus 102 may be positioned within the same physical environment as the image capture device 108, sensors 107, rendering apparatus 109, and tactile output device 110 such that the biomechanical data ingestion apparatus 102 may communicate in a localized manner (e.g., wired connection or wireless connection such as WiFi, BLUETOOTH, etc.).

In essence, the image capture device 108 may be used to capture large motor movements, whereas the sensors 107 may be utilized to detect more subtle, fine motor movements (e.g., of the pelvis).

In one embodiment, the biomechanical assessment server 101 receives a user input, from the biomechanical data ingestion apparatus 102, that indicates the type of exercise (e.g., squat, lunge, etc.) being performed by the user. In another embodiment, the biomechanical assessment server 101 receives the image data without a user input indicating the type of exercise, and determines the type of exercise based on an image analysis of the image data. The biomechanical assessment server 101 may be in operable communication with an exercise database 111 that stores data indicative of various exercises based on exercise analytics. For example, the biomechanical assessment server 101 may compare, in real-time, a portion of the image data (e.g., the first five seconds) to a portion of exercise image data stored in the exercise database 111 to determine which exercise in the exercise database 111 mostly closely matches the portion of the image data. In particular, a confidence score may be assigned to different exercises in the exercise database 111 based on such analysis. If none of the exercises match the portion of the image data based on a confidence score that exceeds a predetermined confidence threshold, the biomechanical assessment server 101 may compare additional portions of the image data until the predetermined confidence threshold is met. For example, determination of a bench press exercise may be assessed more quickly than that of a squat, given the shorter range of motion. Determining the correct exercise may significantly affect which biomechanical rules are used for analysis by the biomechanical rules engine 103. For instance, the exercise database 111 may have stored therein one or more biomechanical rules corresponding to each exercise, which may vary significantly from exercise to exercise (e.g., a tolerance level for knee flexion in a squat may be less restricted than a tolerance level for knee flexion during a bench press where the legs should be positioned in a relatively stationary position).

FIG. 1B illustrates localized configuration of the interactive visualization system 100. For example, rather than having a localized biomechanical data ingestion apparatus 102 and a remotely situated biomechanical assessment server 101, as illustrated in FIG. 1A, the interactive visualization system 100 may have a biomechanical assessment apparatus 151 that is localized. In other words, the biomechanical assessment apparatus 151 may be have all of the componentry of both the localized biomechanical data ingestion apparatus 102 and the remotely situated biomechanical assessment server 101 positioned in one physical environment (e.g., a living room). For example, the biomechanical assessment apparatus 151 may be a set-top box that has the biomechanical rules engine 103, the virtual sports feedback cue engine 104, and the biomechanical cue rendering engine 106 all integrated therein. As a result, the biomechanical assessment apparatus 151 may ingest various data (e.g., image data, sensed data, etc.) and process that data for output via various output devices.

In another embodiment, various componentry illustrated in the cloud-based configuration may be performed by the biomechanical data ingestion apparatus 102, and other componentry illustrated in the localized configuration may be performed by the biomechanical assessment server 101.

In yet another embodiment, an artificial intelligence ("AI") system may be utilized to perform the biomechanical assessment and generate recommendations based on the virtual sports performance expert cues. For example, the AI system may perform machine learning to determine which cues worked best for a particular user, or a group of users, and then generate those cues in similar situations. For instance, the AI system may determine that the virtual cue of the virtual sports performance expert pointing to the user's knee has statistically outperformed (i.e., better response time for user correction) the virtual cue of the virtual sports performance expert pointing to his or her own knee.

Figure 2A:
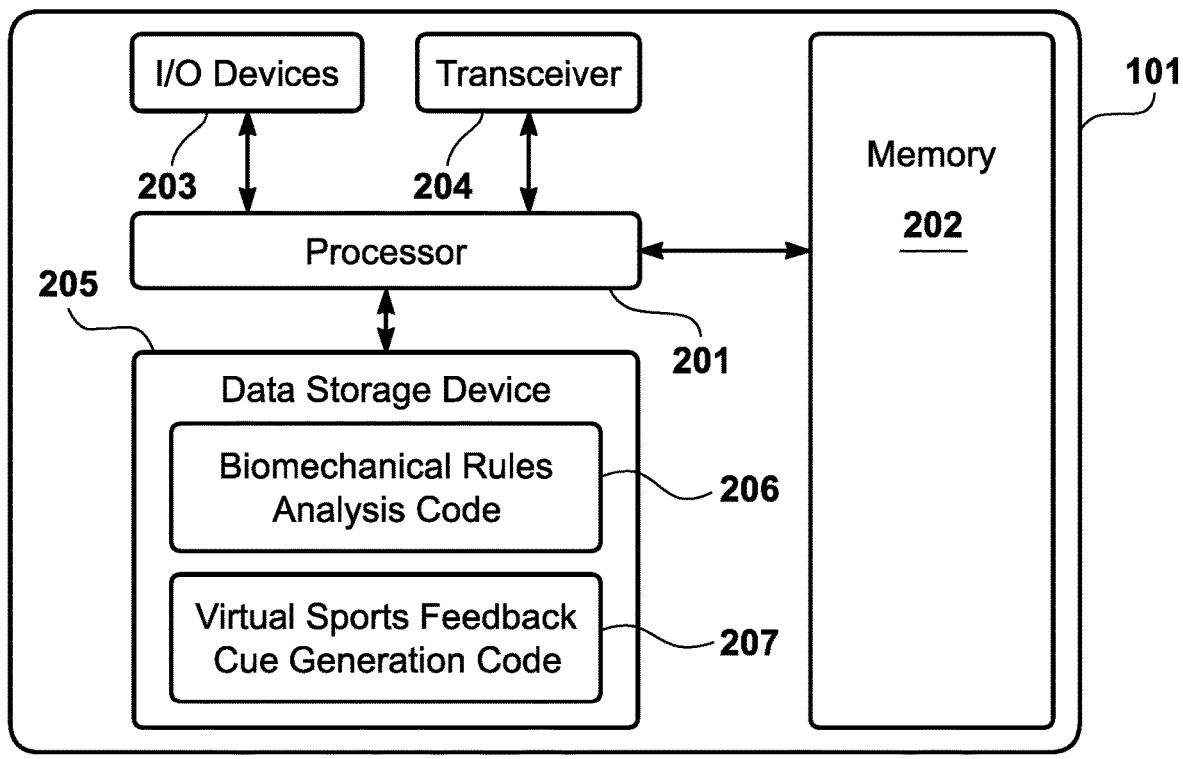
FIG. 2A illustrates a system configuration for the biomechanical assessment server illustrated in FIG. 1A.
Figure 2B:
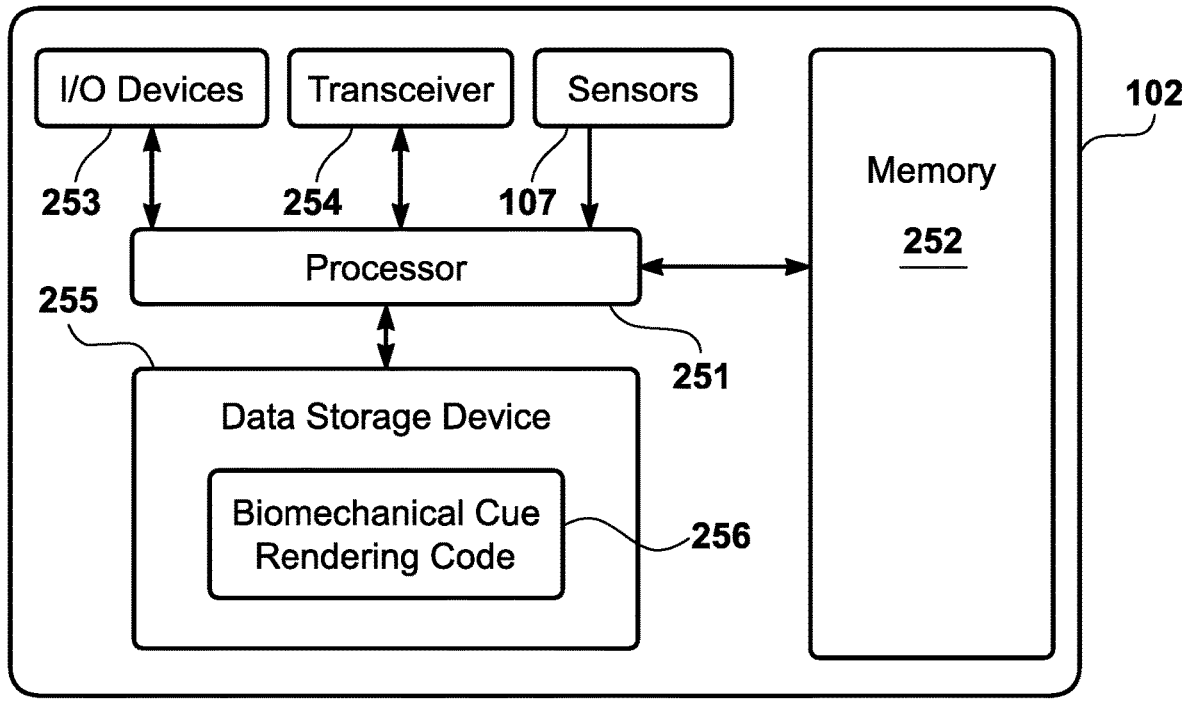
FIG. 2B illustrates a system configuration for the biomechanical data ingestion apparatus illustrated in FIG. 1A.

FIGS. 2A and 2B illustrate system configurations for the various componentry of the interactive visualization system 100 illustrated in FIG. 1A. In particular, FIG. 2A illustrates a system configuration for the biomechanical assessment server 101 illustrated in FIG. 1A. In particular, a processor 201, which may be specialized for image analysis may be used to perform the operations illustrated in FIG. 1A for determining compliance with the one or more biomechanical rules.

The system configuration may also include a memory device 202, which may temporarily store computer readable instructions performed by the processor 201. As an example of such computer readable instructions, a data storage device 205 within the system configuration may store biomechanical rules analysis code 206 and virtual sports feedback cue generation code 207. The processor 201 may execute the biomechanical rules analysis code 206 to establish the biomechanical rules and determine compliance with the biomechanical rules. Furthermore, the processor 201 may execute the virtual sports feedback cue generation code 207 to generate one or more virtual sports feedback cues.

Moreover, the system configuration may have one or more input/output ("I/O") devices 203 that may receive inputs and provide outputs. Various devices (e.g., keyboard, microphone, mouse, pointing device, hand controller, joystick, etc.) may be used for the I/O devices 203. The system configuration may also have a transceiver 204 to send and receive data. Alternatively, a separate transmitter and receiver may be used instead.

By way of contrast, FIG. 2B illustrates a system configuration for the biomechanical data ingestion apparatus 102 illustrated in FIG. 1A. In particular, a processor 251, which may be specialized for image rendering, may be used to perform rendering of the virtual sports performance expert, and corresponding virtual cues.

The system configuration may also include a memory device 252, which may temporarily store computer readable instructions performed by the processor 251. As an example of such computer readable instructions, a data storage device 255 within the system configuration may store biomechanical cue rendering code 256. The processor 251 may execute the biomechanical cue rendering code 256 to render virtual cues performed by the virtual sports performance expert. In another embodiment, the virtual sports feedback cue generation code 207 is stored by the data storage device 255, instead of the data storage device 205, thereby allowing the biomechanical data ingestion apparatus 102 to not only render the virtual sports performance expert and/or associated virtual cues, but also generate the virtual sports performance expert and/or associated virtual cues for rendering.

Moreover, the system configuration may have the sensors 107 integrated therein, or may be in operable communication with the sensors 107. Additionally, the system configuration may have one or more input/output ("I/O") devices 253 that may receive inputs and provide outputs. Various devices (e.g., keyboard, microphone, mouse, pointing device, hand controller, joystick, etc.) may be used for the I/O devices 253. The system configuration may also have a transceiver 254 to send and receive data. Alternatively, a separate transmitter and receiver may be used instead.

Figure 3A:
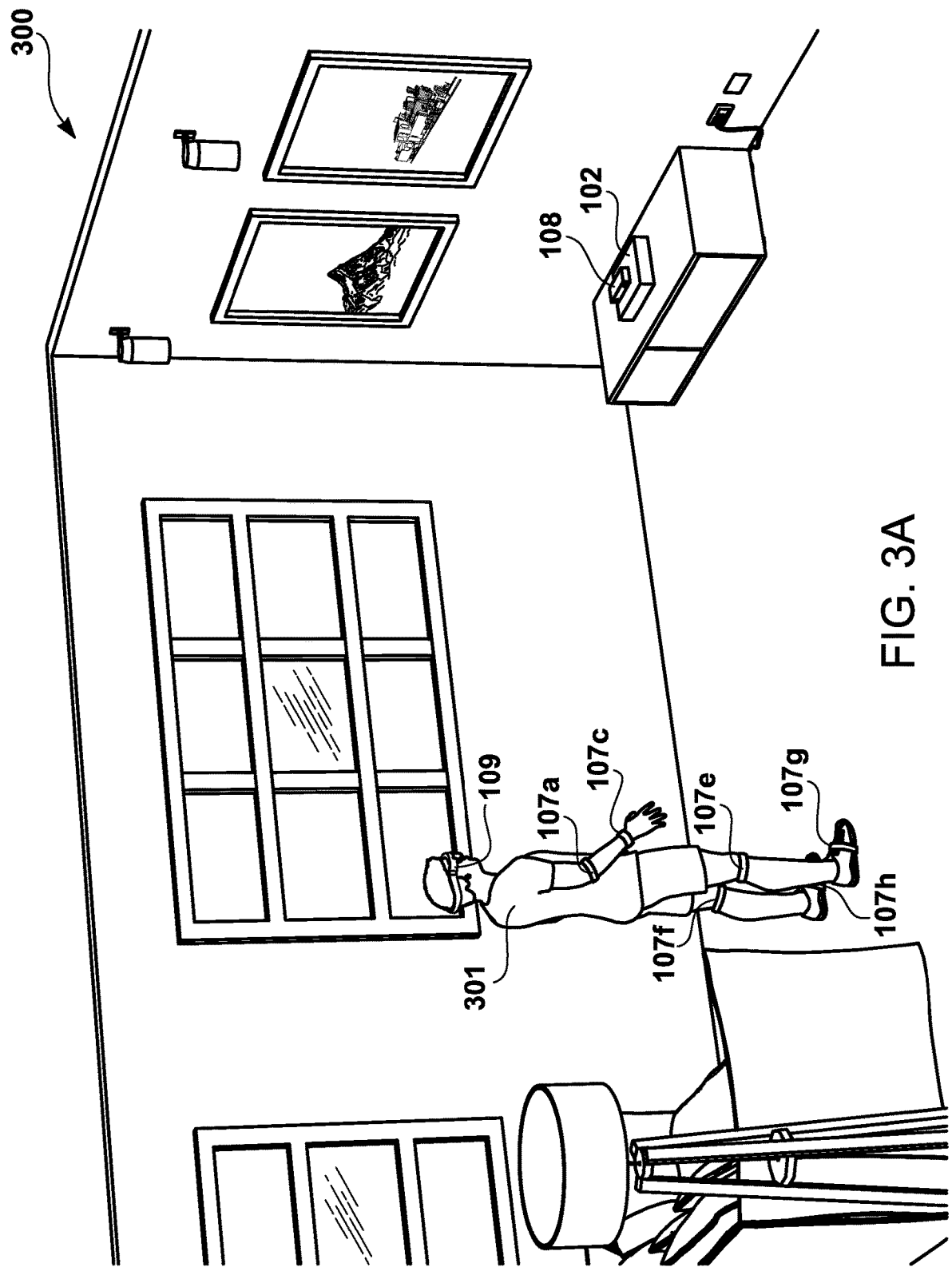
FIG. 3A illustrates an example of the user wearing a rendering output device, such as an augmented reality ("AR") head-mounted display ("HMD").

FIGS. 3A-3F illustrate a physical environment 300, such as a living room, in which a user 301 performs an exercise, or other type of athletic movement in conjunction with an AR configuration of the interactive visualization system 100 illustrated in FIGS. 1A and 1B. In particular, FIG. 3A illustrates an example of the user 301 wearing a rendering apparatus 109, such as an AR HMD. Accordingly, the user 301 may obtain a mixed-reality ("MR") experience while being present in his or her living room. Additionally, the user 301 may wear one or more sensors 107*a*-*h* (e.g., on the elbows, wrists, knees, feet) that may sense data of the user 301 during performance of the exercise, or other type of athletic movement. (Alternatively, other anatomical structures other than those illustrated (e.g., head, arms, legs, hands, ankles, fingers, thumbs, thorax, spine, pelvis, etc.) may utilized for placement of sensors on the user 301.) The sensors 107*a*-*h* are illustrated as being integrated within one or more straps/bands. Alternatively, the sensors may be adhered to the user 301 via various other configurations (e.g., clips, hook-and-loop fasteners, etc.).

The physical environment 300 may also have a biomechanical data ingestion apparatus 102 as a set-top box, which is in operable communication with an image capture device 108. (Although the set-top box is illustrated as being distinct from the image capture device 108, it may have the image capture device 108 integrated therein.) As the user 301 performs the exercise, or other athletic movement, the image capture device 108 captures images (e.g., motion capture) of the anatomical structure of the user 301 during the biomechanical movement. The image capture device 108 may then provide the captured imagery to the set-top box. Additionally, or alternatively, the sensors 107*a*-*h* may sense various data particular to the user 301 during the performance of the exercise, or athletic movement. In one embodiment, the sensors may emit one or more wireless signals to transmit the sensed data directly to the set-top box, or indirectly to the set-top box via the AR HMD, which may be in wireless communication with the set-top box. Furthermore, the set-top box may synchronize the various ingested data (e.g., via timestamps) to ensure that the imagery and sensed data match the same timeline.

In an alternative embodiment, the image capture device 108 may generate a body map of the user, which may be translated to skeletal data by the processor 201, illustrated in FIG. 2A, and/or the processor 251, illustrated in FIG. 2B. In essence the body map may capture large motor movements, thereby allowing for a lesser quantity of, or no, sensors 107.

As illustrated in FIG. 1A, the biomechanical data ingestion apparatus 102 illustrated in FIGS. 3A-3D (e.g., set-top box) may send the ingested data to the remotely situated (i.e., in a different geographic location than the home of the user) biomechanical assessment server 101 to automatically perform analysis based on the biomechanical rules established by the biomechanical rules engine 103. Alternatively, as illustrated in FIG. 1B, the biomechanical data ingestion apparatus 102 may locally perform the biomechanical rules analysis, without communication with a remotely situated server.

Figure 3B:
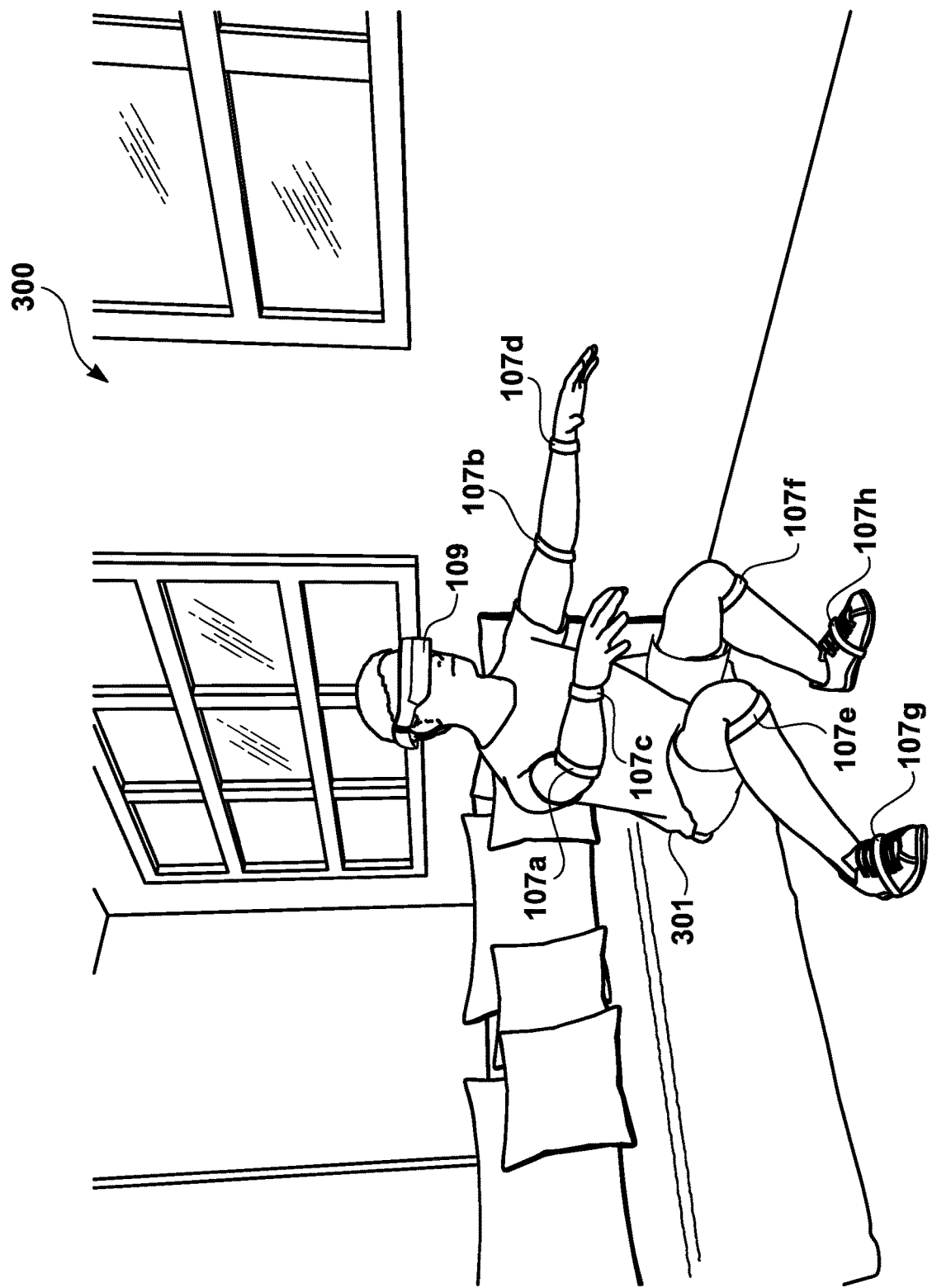
FIG. 3B illustrates the user squatting into the fully squatted position, but with a misalignment of his or her right knee.
Figure 3D:
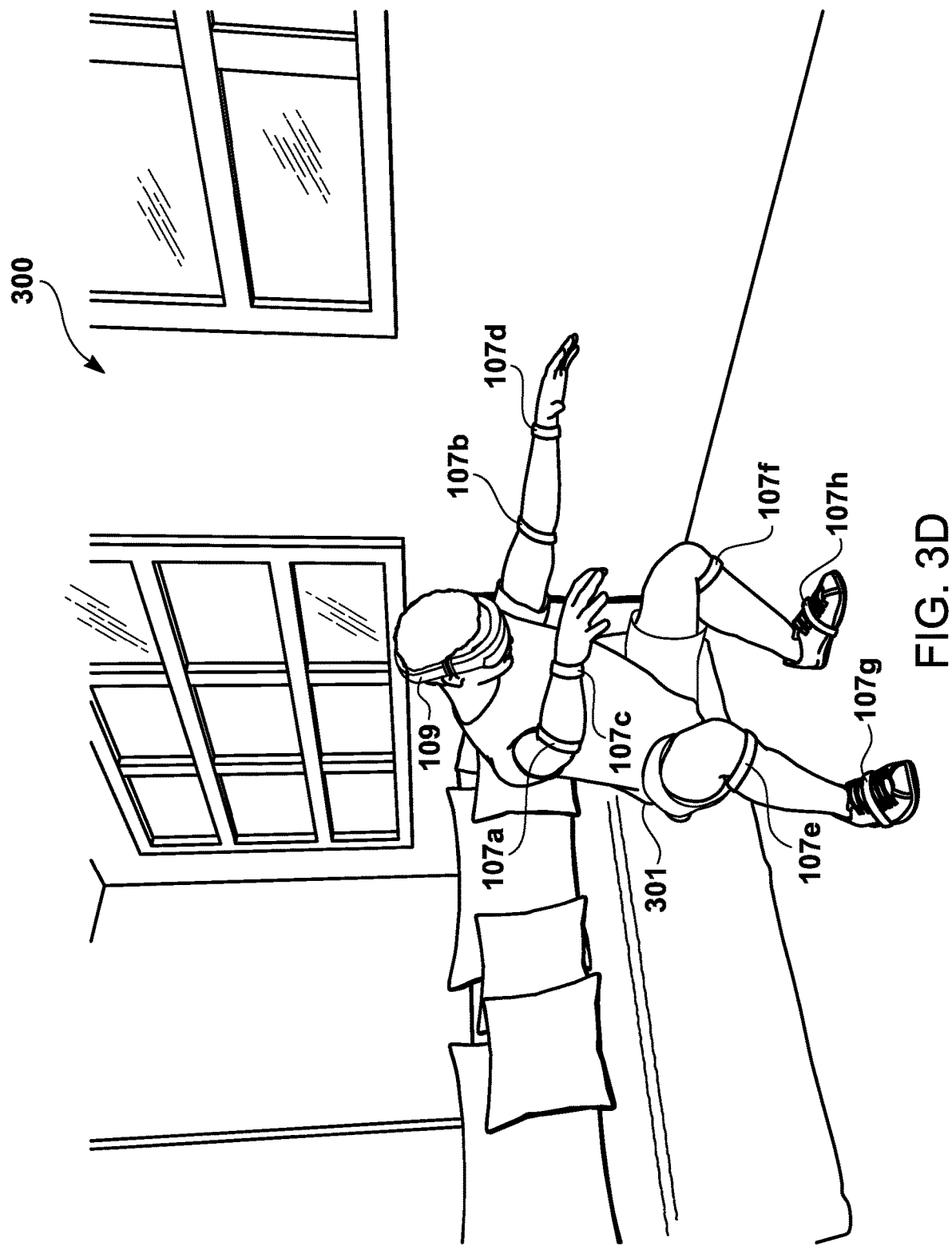
FIG. 3D illustrates the user positioning his or her knee correctly to comply with the biomechanical rules.

As an example, FIG. 3A illustrates the user 301 positioned to begin a squat exercise. The image capture device 108 and/or the sensors 107*a*-*h* may begin capturing/sensing data at the beginning of the exercise, before the user 301 has fully squatted into the squat position. FIG. 3B illustrates the user 301 squatting into the fully squatted position, but with a misalignment of his or her right knee. Via the rendering apparatus 109 (e.g., AR HMD), the user 301 is able to visualize a virtual sports performance expert that provides virtual and/or audible cues to the user 301 to correct the misalignment. Accordingly, FIG. 3C illustrates the user 301 repositioning his or her head to view the real-world misalignment/imbalance indicated by the virtual and/or audible cue presented by the virtual sports performance expert. As a result, the user 301 is able to view his or her knee being misaligned. Furthermore, an AR overlay may include virtual imagery (alignment indicators, colors, etc.) to provide virtual cues positioned on the anatomical structure of the user 301 to correct the misalignment/imbalance. Additionally, or alternatively, a tactile output device 110 may be positioned on the user 301 to provide tactile feedback to the user 301 to correct the imbalance or misalignment. FIG. 3D illustrates the user 301 positioning his or her knee correctly to comply with the biomechanical rules (e.g., joint angles, ranges of motion, etc.). (The squat is just one of many exercises, or athletic movements, that may be performed by the user 301, and is illustrated only as an example of an exercise.)

Figure 3E:
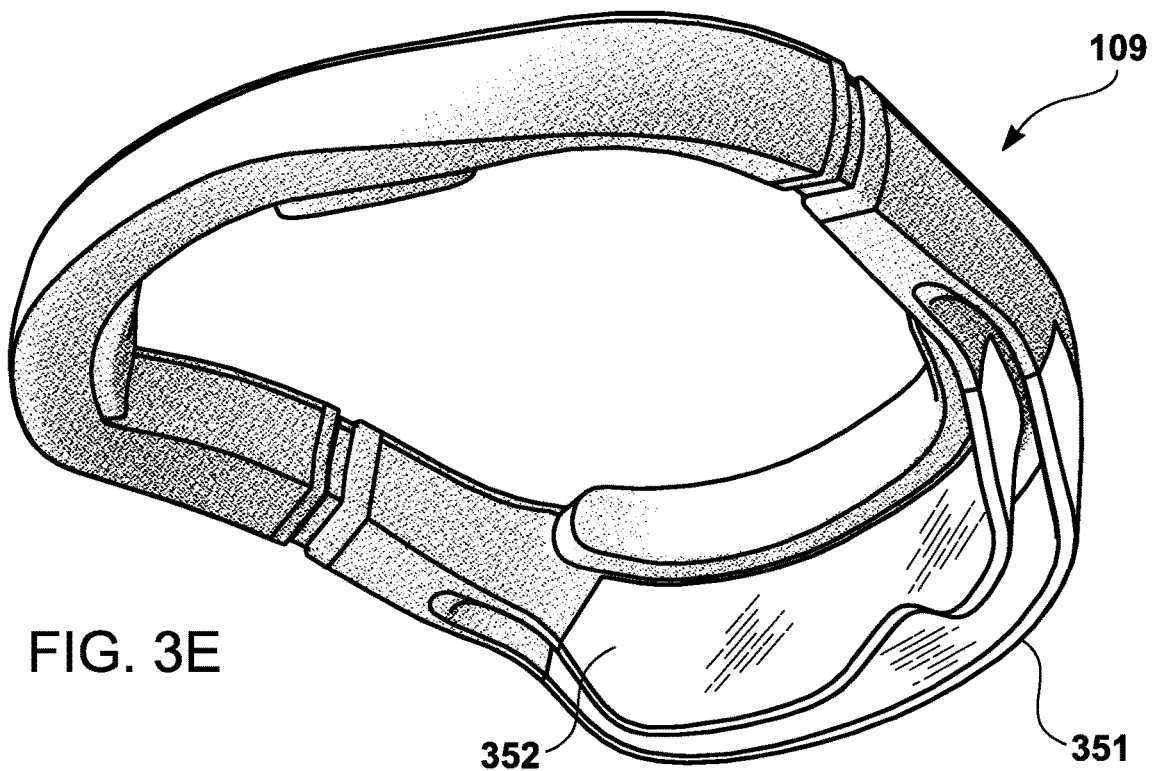
FIG. 3E illustrates an example of the rendering apparatus, depicted from an inner perspective view, being an AR HMD.
Figure 3F:
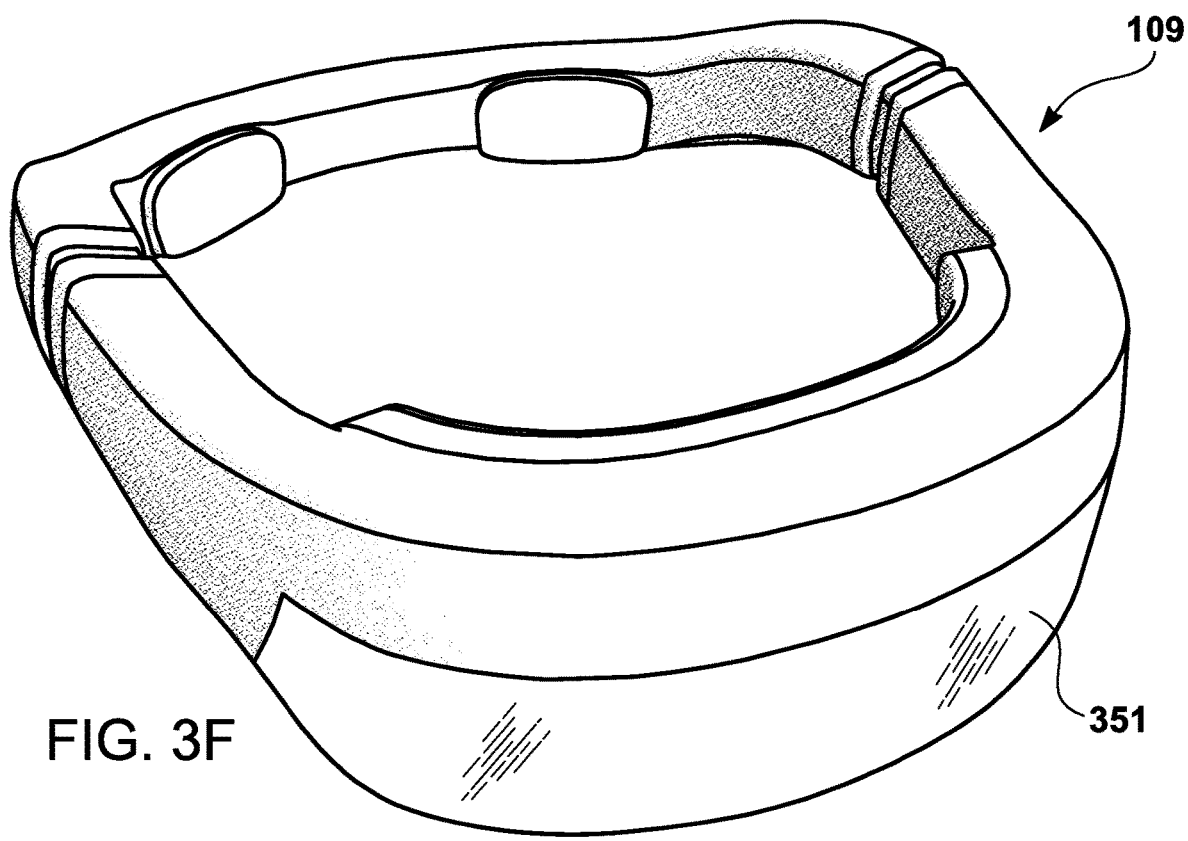
FIG. 3F illustrates the rendering apparatus, depicted from an outer perspective view.

Moreover, FIG. 3E illustrates an example of the rendering apparatus 109, depicted from an inner perspective view, being an AR HMD. In essence, the AR HMD may have an outer display 351, through which the user 301 views real-world imagery, and an inner display 352, through which virtual imagery overlays the real-world imagery. As a result, the user 301 is able to view his or her actual anatomical structure during performance of the exercise. Other types of AR HMDs other than the one illustrated in FIG. 3E may be utilized to perform the rendering. Furthermore, devices (e.g., smartphone, tablet device, smartwatch, etc.) other than an AR HMD may be utilized to perform the AR rendering. Finally, FIG. 3F illustrates the rendering apparatus 109, depicted from an outer perspective view.

Although the AR HMD is illustrated as receiving various inputs from the biomechanical data ingestion apparatus 102 (e.g., set-top box), alternatively, the AR HMD may itself be the biomechanical data ingestion apparatus 102; thus, the AR HMD may receive inputs directly from various componentry (e.g., sensors 107) and/or communicate with the biomechanical assessment server 101.

Figure 4A:
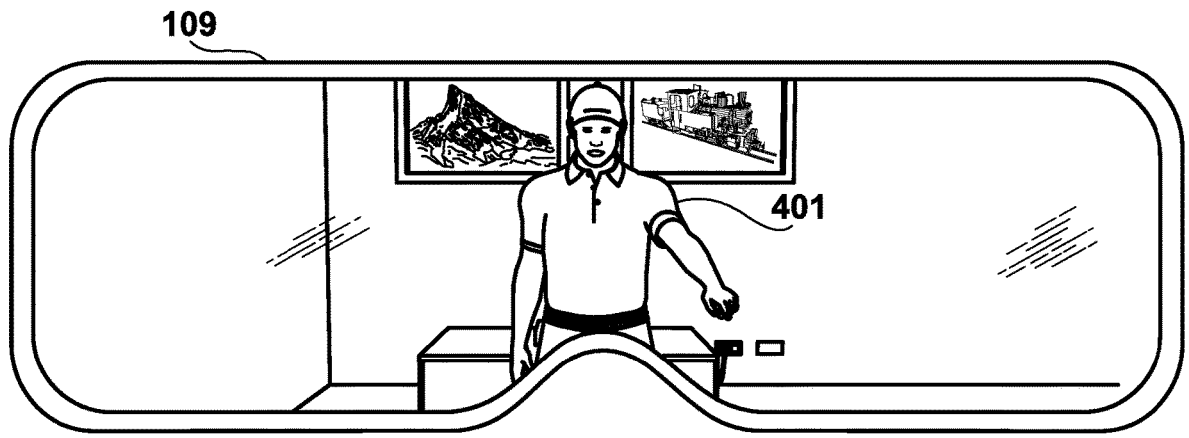
FIG. 4A illustrates a virtual sports performance expert that is rendered as an AR overlay over the real-world scenery of the physical environment illustrated in FIG. 3A.

FIGS. 4A-4F illustrate examples of real-world and virtual world imagery rendered by the AR rendering apparatus 109 illustrated in FIGS. 3A-3F. For example, FIG. 4A illustrates a virtual sports performance expert 401 that is rendered as an AR overlay over the real-world scenery of the physical environment 300 (e.g., living room) illustrated in FIG. 3A. As the user 301 buckles his or her right knee inward, the virtual sports performance expert 401 may provide a virtual feedback cue (e.g., pointing to the right knee of the user 301, pointing to one of his or her own knees, etc.).

Figure 4B:
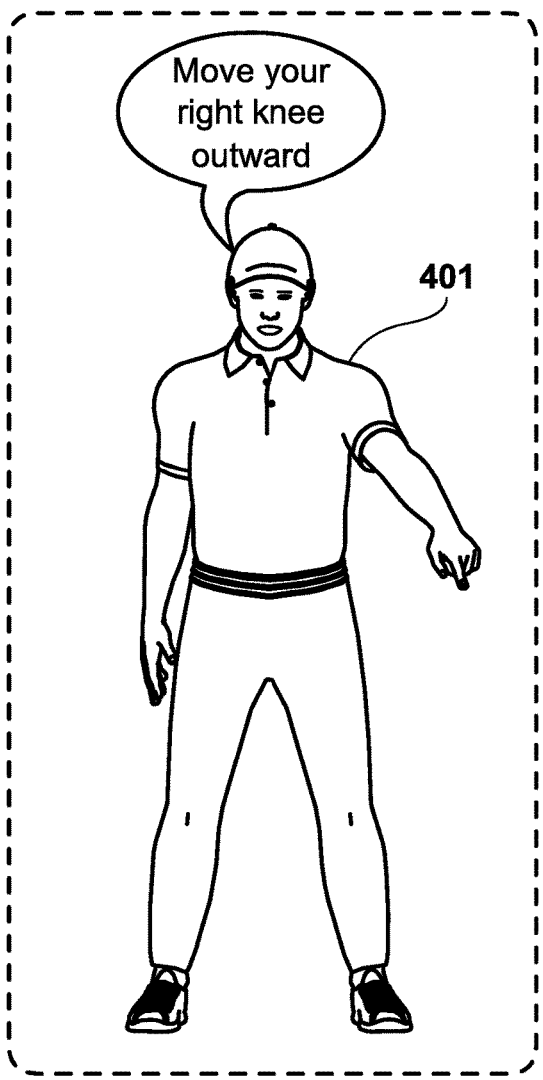
FIG. 4B illustrates audio being outputted to correspond to the virtual feedback cue.

Furthermore, the I/O devices 253 of the biomechanical assessment apparatus 151 and/or the AR HMD may include an audio speaker that outputs audio corresponding to the virtual feedback cue, as depicted by FIG. 4B. For example, the audio speaker may output the following: "move your right knee outward." The audio may be synchronized with virtual lip movements of the virtual sports performance expert 401.

Upon receiving the virtual feedback cue, a natural inclination of the user 301 may be to view the anatomical structure referred to by the virtual sports performance expert 401. For example, as illustrated by FIG. 4C, the user 301 may gaze downward through the AR HMD toward his or her right knee to view the misalignment pointed out by the virtual sports performance expert. In one embodiment, one or more virtual feedback cues may be overlaid over one or more anatomical structures of the user 301, rather than the virtual sports performance expert. For instance, a biomechanical compliant indicator 403 may be a geometric shape (e.g., lines indicating ranges, circles, squares, rectangles) or marker (e.g., arrow), either of which may have a corresponding pattern, color, text, or imagery to indicate compliance with the biomechanical rules. For example, AR imagery encompassing green boundary lines may indicate that the left knee of the user 301 is within a permissible range of motion along a particular three-dimensional axis or plane. Conversely, a biomechanical non-compliant indicator 402 may be a geometric shape or marker to indicate non-compliance with the biomechanical rules. For example, AR imagery encompassing red boundary lines may indicate that the right knee of the user 301 is within an impermissible range of motion along a particular three-dimensional axis or plane, such as the right knee of the user 301 buckling inward during the squatting motion. Moreover, as illustrated by FIG. 4D, a biomechanical non-compliant indicator 402 may change to a biomechanical compliant indicator 403 upon the user 301 correcting his or her anatomical structure to take into account the feedback of the virtual sports performance expert 401.

Additionally, FIGS. 4E and 4F illustrate variations of the biomechanical non-compliant indicator 402 and the biomechanical compliant indicator 403. In particular, FIG. 4E illustrates an example of the biomechanical non-compliant indicator 402 being a circle that may or may not have associated imagery (e.g., an "x" mark) to indicate non-compliance. Furthermore, the biomechanical non-compliant indicator 402 may or may not have an associated color (e.g., red to indicate non-compliance). FIG. 4F illustrates an example of the biomechanical compliant indicator 403 being a circle that may or may not have associated imagery (e.g., a checkmark) to indicate compliance. Furthermore, the biomechanical compliant indicator 403 may or may not have an associated color (e.g., green to indicate compliance).

Additional imagery may be rendered to provide additional cues to assist the user 301 in performing correction of an anatomical structure. For example, various imagery, such as an arrow, may indicate that the user should move his or her knee in a particular direction. Accordingly, the virtual sports feedback cues may identify an anatomical structure that necessitates correction and/or may provide a visual recommendation on how the user 301 may perform the correction.

Figure 5:
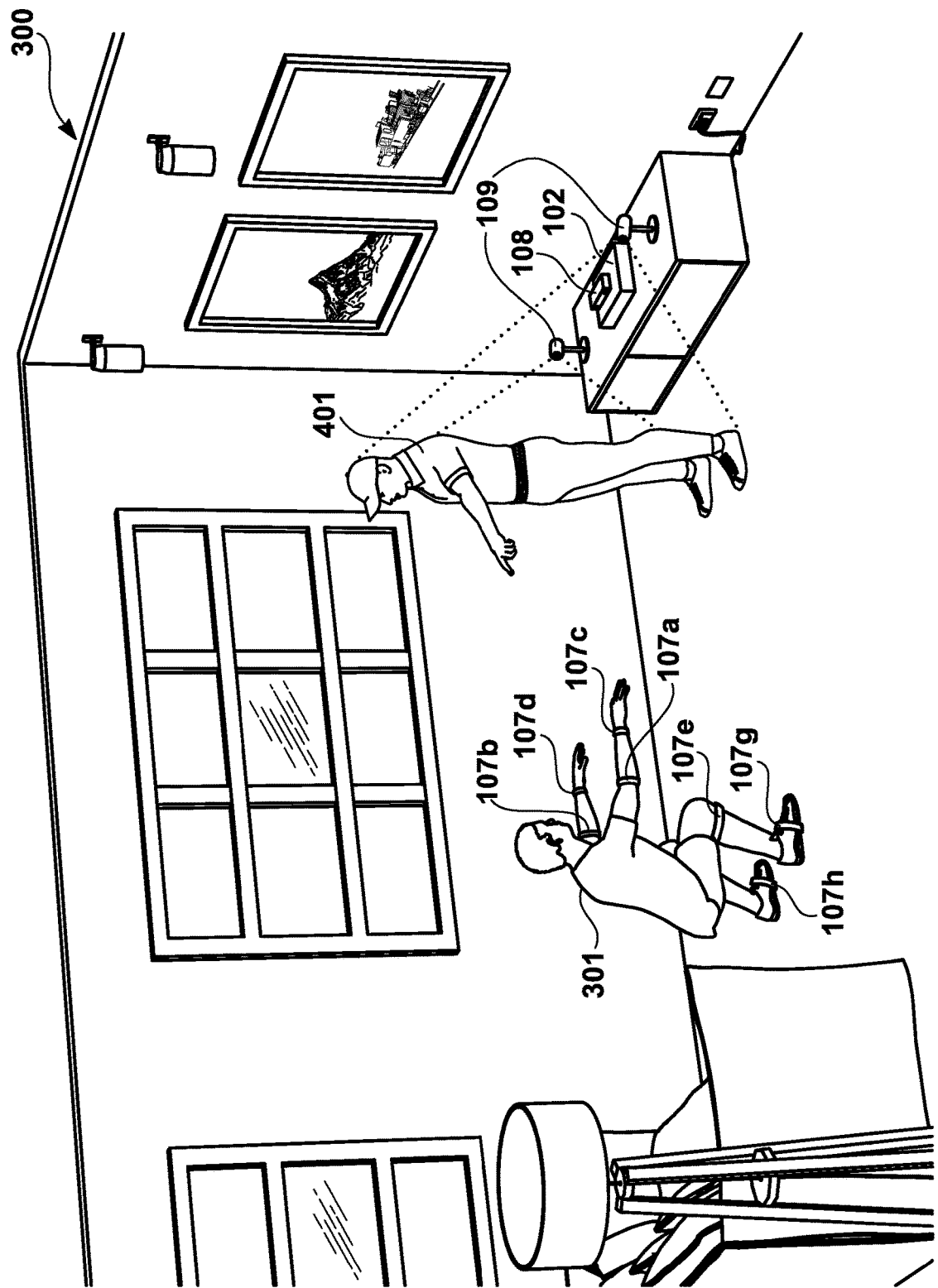
FIG. 5 illustrates a holographic projection system within the physical environment that may be implemented by the interactive visualization system illustrated in FIGS. 1A and 1B.

In another embodiment, the interactive visualization system 100 illustrated in FIGS. 1A and 1B may be implemented as a holographic projection system within the physical environment 300, as illustrated by FIG. 5. For example, the rendering apparatus 109 may encompass one or more holographic projectors that are in operable communication with the biomechanical data ingestion apparatus 102, and may generate a hologram of the virtual sports performance expert 401. (Although two holographic projectors are illustrated, fewer or more holographic projectors may be utilized.) Therefore, without wearing an AR HMD, the user 301 is able to benefit from coaching by the virtual sports performance expert 401 within the convenience of his or her own home.

Figure 6A:
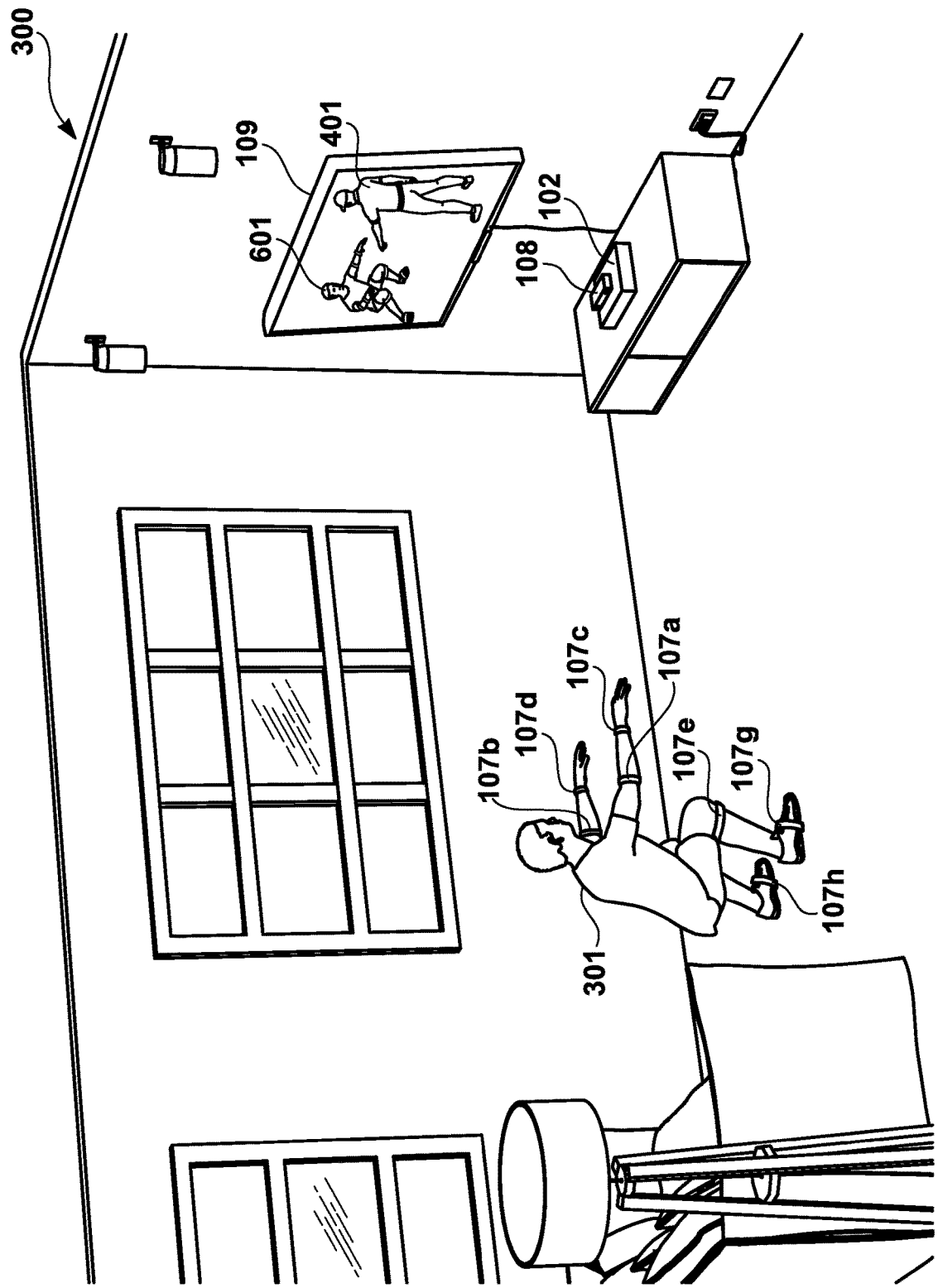
FIG. 6A illustrates an example of the rendering apparatus as a television that is in operable communication with the biomechanical data ingestion apparatus.
Figure 6B:
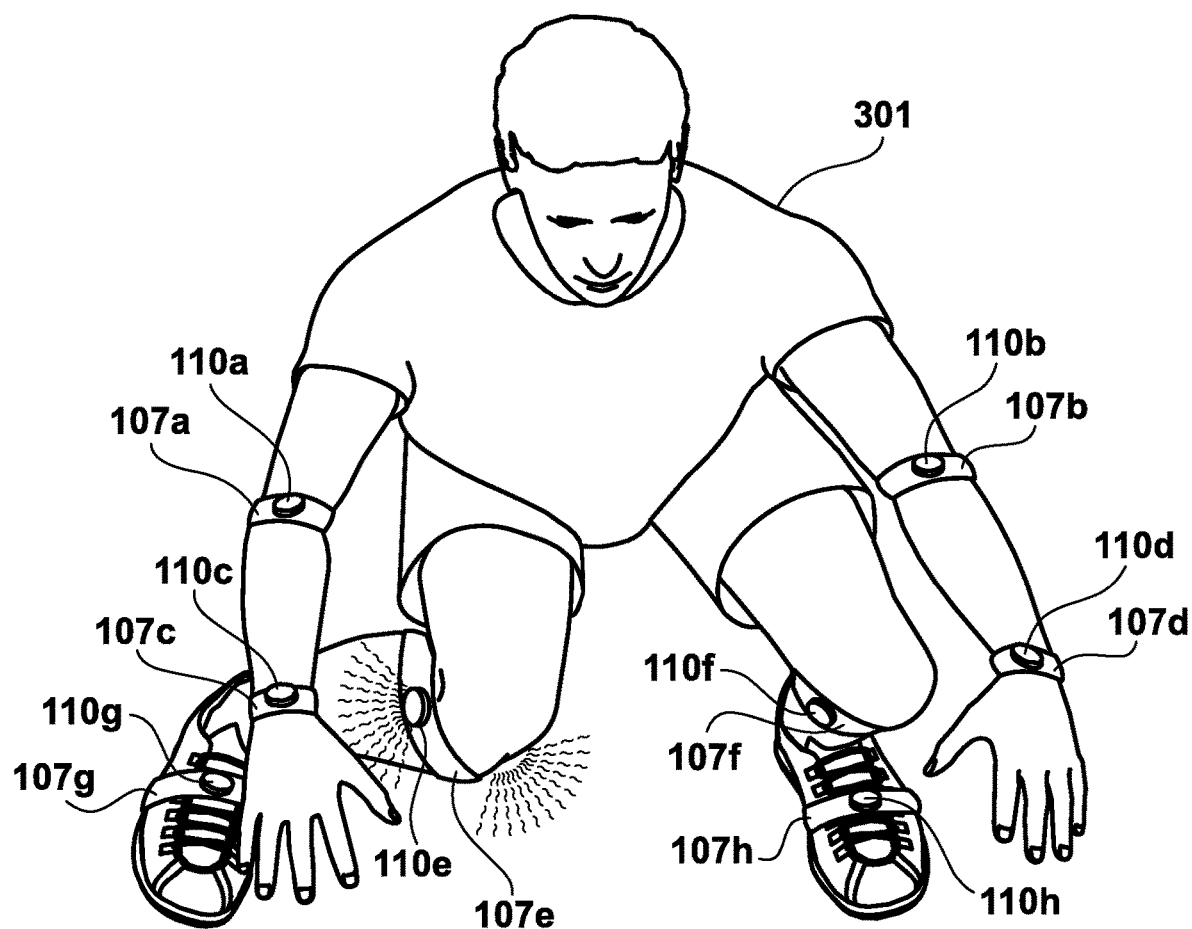
FIG. 6B illustrates one or more tactile output devices, such as haptic vibration units, adhered to the user.

As yet another alternative, as illustrated by FIGS. 6A and 6B, the rendering apparatus 109 may be utilized to render an avatar 601 of the user 301 interacting with the virtual sports performance expert 401 within an virtual environment. In particular, FIG. 6A illustrates the rendering apparatus 109 as a television that is in operable communication with the biomechanical data ingestion apparatus 102. (Other types of display devices (e.g., smartphone, tablet device, etc.) may be used instead.) The television may display an avatar 601 that performs the exercise of the user 301 simultaneously, or in near simultaneity (humanly imperceptible time delay or insignificant time delay), with the real-world performance of the exercise by the user 301. Accordingly, as the user 301 performs a movement, the avatar 601 performs substantially the same movement (e.g., a squat performed by the user 301 in the physical environment 300 coincides with a graphical representation of a movement that would be humanly perceived as a squat performed by the avatar 601 as rendered by the rendering apparatus 109) in real-time, or substantial real-time, of the physical movement of the user 301. Furthermore, the virtual sports performance expert 401 may provide a virtual sports performance feedback cue in real-time, or substantial real-time, of the physical movement of the user 301. As a result, the user 301 is able to visualize himself or herself performing the physical movement, via the avatar 601, without having to look down at a specific anatomical structure, such as the knee. The user 301 may maintain proper head position, while viewing any misalignments on the avatar 601, as indicated by the virtual feedback cues provided by the virtual sports performance expert 401. Additional cues, such as audio cues or tactile output cues (e.g., via a haptic vibration unit), may also be provided to the user 301.

Furthermore, FIG. 6B illustrates one or more tactile output devices 110a-h, such as haptic vibration units, adhered to the user 301. (The one or more tactile output devices 110a-h may be adhered to the sensors 107a-h (e.g., via the integrated sensor straps/bands), integrated within the sensors 107a-h, or may be positioned on the user 301 distinctly from the sensors 107a-h.) In conjunction with visualizing any misalignments/imbalances on the avatar 601 in the virtual environment depicted by the rendering apparatus 109 (e.g., television), as pointed out by the virtual sports performance expert 401, the user 301 may experience tactile feedback at the anatomical structure (e.g., knee) of the avatar 601 pointed to in the virtual environment, but in the real-world physical environment. Furthermore, the biomechanical data ingestion apparatus 102 (e.g., set-top box) may send the tactile feedback instruction, in real-time or substantial real-time from indication of the virtual sports performance cue, to the tactile output device 110e corresponding to the anatomical structure of the user 301 (e.g., right knee) that matches the anatomical structure of the avatar 601 that is the subject of the virtual sports feedback cue indicated by the sports performance expert 401. As a result, the user 301 is able to receive tactile feedback in real-time or substantial real-time in the physical environment 300 of the virtual sports performance cue being provided in the virtual environment by the virtual sports performance expert 401. In one embodiment, prior to providing instructions to the tactile output devices 110a-h, the biomechanical data ingestion apparatus 102 performs a calibration process to match a particular tactile output device to a particular anatomical structure of the user 301.

The tactile output devices 110a-h are not limited to use with the avatar configuration illustrated in FIG. 6A. For example, the tactile output devices 110a-h may be utilized with an AR HMD, holographic projection system, etc.

Furthermore, the tactile output devices 110a-h are not limited to identification of anatomical structures, such as the right knee, lacking compliance with one or more biomechanical rules. For instance, the cause of the right knee moving inward is often attributed to a muscular weakness/imbalance in the glute area. Accordingly, a tactile output device may additionally, or alternatively, be positioned in the glute area. Upon a determination, via the image capture device 108 and the sensor 107, that the right knee is not in proper position during the squat exercise, the virtual sports performance expert 401 may point to the right knee of the user 301 while the tactile output device 110e positioned at the right knee of the user 301 emits a vibration. Subsequently, or alternatively, the virtual sports performance expert 401 may point, potentially with corresponding audio, to the glute area while a tactile output device 110 in the glute area, which may not necessarily have a corresponding sensor 107 adhered thereto, emits a vibration to inform the user 301 to focus on tightening the muscles in that area to correct the misalignment of the right knee. (The foregoing example is provided only as an example, given that other types of anatomical structures may be identified as lacking compliance with the one or more biomechanical rules, and other distinct anatomical structures may be recommended as areas of focus to correct the problem with the initial anatomical structure.)

Figure 7:
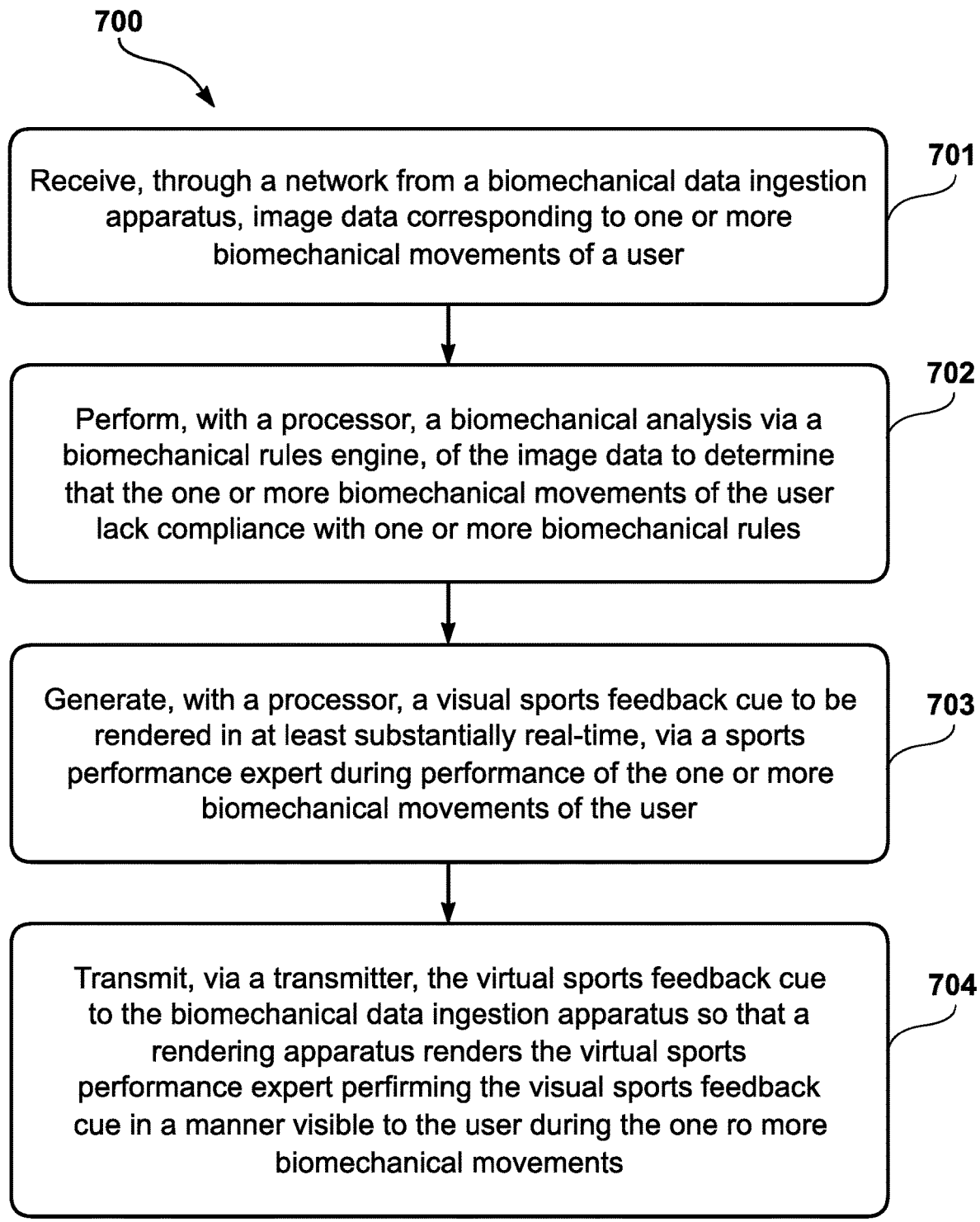
FIG. 7 illustrates a process that may be utilized by the interactive visualization system illustrated in FIGS. 1A and 1B.

FIG. 7 illustrates a process 700 that may be utilized by the interactive visualization system 100 illustrated in FIGS. 1A and 1B. At a process block 701, the process 700 receives, through the network 105 from the biomechanical data ingestion apparatus 102, image data corresponding to one or more biomechanical movements of the user 301. The receiver may be remotely situated from the biomechanical data ingestion apparatus 102. Furthermore, at a process block 702, the process 700 performs, with the processor 201 illustrated in FIG. 2A, a biomechanical analysis, via the biomechanical rules engine 103, of the image data to determine that the one or more biomechanical movements of the user 301 lack compliance with the one or more biomechanical rules. Additionally, at a process block 703, the process 700 generates, with the processor 201, a virtual sports feedback cue to be rendered, in at least substantial real-time, via the virtual sports performance expert 401 during performance of the one or more biomechanical movements of the user 301. Finally, at a process block 704, the process 700 transmits, via a transmitter, the virtual sports feedback cue to the biomechanical data ingestion apparatus 102 so that the rendering 109 apparatus renders the virtual sports performance expert 401 performing the virtual sports feedback cue in a manner visible to the user 301 during the one or more biomechanical movements. Although the process 700 is directed toward a cloud-based configuration of the interactive visualization system 100, alternatively, the process 700 may be directed toward a configuration that is performed locally within the physical environment 300, such as via a set-top box with various integrated componentry and/or external componentry situated within the physical environment 300 through which the set-top box is in operable communication.

Although various illustrations depict both the user of an image capture device 108 and sensors 107, various configurations may utilize one or the other. For example, the interactive visualization system 100 may be used to generate the virtual sports performance expert 401 and corresponding virtual sports feedback cues based solely on the captured image data that is analyzed for purposes of compliance with the one or more biomechanical rules. As another example, the interactive visualization system 100 may be used to generate the virtual sports performance expert 401 and corresponding virtual sports feedback cues based solely on the sensed data that is analyzed for purposes of compliance with the one or more biomechanical rules.

In another embodiment, the interactive visualization system 100 not only identifies misalignments/imbalances while the user 301 is performing a biomechanical movement, but also generates recommended exercises (i.e., a training regimen) based on the identified misalignments/imbalances. For example, the interactive visualization system 100 may determine based on various factors (e.g., type of sport in which the user 301 participates, frequency of misalignments/imbalances, force production (general strength), force absorption (impact control), force redistribution (reactive strength), rate of force development (power), etc.) a set of exercises to help the user 301 preemptively strengthen muscles to avoid injury at the area of misalignment/imbalance. Furthermore, the interactive visualization system 100 may generate virtual cues for the virtual sports performance expert 401 to articulate (e.g., via virtual limb movement) to coach the user 301 on one or more additional exercises to that being initially performed by the user 301. Moreover, the interactive visualization system 100 may utilize an AI system to generate recommendations for the exercise regimen, and adjust the exercise regimen over time based on biomechanical performance of the user 301 (e.g., more or less of an additional exercise to build strength in a knee to assist with the squat exercise, depending on more or less misalignment/imbalance of a knee.).

Various other types of componentry other than the sensors 107a-h or the image capture device 108 may be utilized to provide input to the interactive visualization system 100. For example, a force plate, which is a measuring instrument on which the athlete may stand during performance of the exercise, or other athletic movement, may be utilized to quantify various biomechanical metrics (e.g., balance, force production, etc.).

Although the virtual sports performance expert 401 is illustrated as identifying (e.g., pointing to) potential anatomical structures and/or biomechanical movements of the user 301 that necessitate correction, the virtual sports performance expert 401 may, in any of the configurations provided for herein, provide a virtual demonstration of how the exercise, or other athletic movement, should be properly performed by the user 301. By viewing that virtual demonstration, the user 301 may then attempt to mimic the demonstrated exercise, or other athletic movement. For instance, the virtual sports performance expert 401 may demonstrate a sports-specific movement that would actually be implemented by the user 301 in his or her given sport (e.g., a basketball close out). The virtual sports performance expert 401 may then break down, via virtual demonstration, the sports-specific movement into individual exercises (e.g., lunge and squat) that are integral to the sports-specific movement (e.g., basketball close out). Accordingly, the virtual sports performance expert 401 provides the user 301 with a training regimen (e.g., drills, exercises, etc.) and explains how that training regimen ties into improvement in a sports-specific context.

Furthermore, the biomechanical rules engine 103, illustrated in FIG. 1A, may be implemented to adapt exercises (e.g., via machine learning performed by an AI system) presented by the virtual sports performance expert 401 based on success or difficulty with compliance with the one or more biomechanical rules. For instance, the biomechanical rules engine 103 may determine that the user 301 has made a number of attempts at the squat exercise that exceeds a predetermined threshold, which may indicate muscular weakness/imbalance in the user 301 that render a proper squat, or other exercise, too difficult for the user 301 at the current time. For example, the user 301 may have weakness in the glute area, which is leading to inward movement of one, or both of, his or her knees. Upon such a determination, the biomechanical rules engine 103 may determine that the virtual sports performance expert 401 should shift from critiquing/demonstrating the squat exercise, to demonstrating a glute exercise to the user 301. At a subsequent time, when the biomechanical rules engine 103 determines that the user 301 is performing the glute exercise properly, the biomechanical rules engine 103 may instruct the virtual sports performance expert 401 to revisit critiquing/demonstrating the squat exercise. (The adaptation from a squat exercise to a glute exercise is just one example of an adaptation, given that many other exercises and adaptations may be utilized instead.) Accordingly, the biomechanical rules engine 103 may generate an interrupt instruction, based on a number of factors (e.g., frequency of non-compliant biomechanical movements, significant deviation of biomechanical movement outside of a particular range, etc.), of a current exercise being performed by the user 301 to have the virtual performance expert 401 critique/demonstrate a supplementary exercise, or other athletic movement. As another example, the supplementary athletic movement may be a particular stretch, which may help increase mobility to improve performance of the exercise, or athletic movement. The virtual sports performance expert 401 may even provide a demonstration of an exercise accessory (e.g., exercise bands, weights, kettlebells, etc.) that may be utilized by the user 301 in conjunction with the exercise to enhance performance. Moreover, the virtual sports performance expert 401 may demonstrate, and/or instruct, the user 301 on proper placement of a tactile output device 110 (e.g., haptic vibration unit) on a particular anatomical structure for a given exercise, after the biomechanical rules engine 103 identifies lack of compliance of a biomechanical rule. The virtual sports performance expert 401 may provide subsequent instructions to the user 301, for subsequent exercises, on where to move the tactile output device 110, thereby minimizing the quantity of tactile output devices 110 worn by the user 301.

A computer is intended herein to include any device that has a specialized processor as described above. For example, a computer may be a personal computer ("PC"), laptop computer, set top box, cell phone, smartphone, tablet device, smart wearable device, portable media player, video player, etc. The configurations provided for herein may be implemented in various forms of computers.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A system comprising:
   a receiver that receives, through a network from a biomechanical data ingestion apparatus, image data corresponding to one or more biomechanical movements of a user, the receiver being remotely situated from the biomechanical ingestion apparatus;
   a processor, in operable communication with the receiver, that performs a biomechanical analysis, via a biomechanical rules engine, of the image data to determine that the one or more biomechanical movements of the user lack compliance with one or more biomechanical rules, the processor generating a virtual sports feedback cue to be rendered, in at least substantially real-time, via a virtual sports performance expert during performance of the one or more biomechanical movements of the user, the biomechanical rules comprising a biomechanical angular threshold for an anatomical joint of the user; and
   a transmitter, in operable communication with the processor, that transmits the virtual sports feedback cue to the biomechanical data ingestion apparatus so that a rendering apparatus renders the virtual sports performance expert performing the virtual sports feedback cue in a manner visible to the user during the one or more biomechanical movements.

2. The system of claim 1, wherein the virtual sports feedback cue is a gesture pointing toward an anatomical structure of the user.

3. The system of claim 1, wherein the virtual sports performance expert is an augmented reality overlay in a physical environment in which the biomechanical ingestion apparatus is situated.

4. The system of claim 3, wherein the processor further generates an augmented reality marker that overlays the anatomical structure of the user that lacks compliance with the one or more biomechanical rules, wherein a color of the augmented reality marker indicates a position of the anatomical structured lacking compliance with the one or more biomechanical rules.

5. The system of claim 1, wherein the virtual sports performance expert is a holographic projected image in a physical environment in which the biomechanical ingestion apparatus is situated.

6. The system of claim 1, wherein the virtual sports performance expert is a virtual image displayed on a display device in a physical environment in which the biomechanical ingestion apparatus is situated.

7. The system of claim 6, wherein the display device is selected from the group consisting of: a television, a smartphone, a tablet device, and a smartwatch.

8. The system of claim 6, wherein the processor further generates an avatar corresponding to the user such that the display device renders the one or more biomechanical movements during performance by the user.

9. The system of claim 1, wherein the receiver further receives, through the network from the biomechanical data ingestion apparatus, inertial motion data indicating one or more inertial measurements corresponding to the one or more biomechanical movements of the user.

10. The system of claim 9, wherein the processor further performs the biomechanical analysis on the inertial motion data in addition to the image data.

11. The system of claim 1, wherein the receiver further receives, through the network from the biomechanical data ingestion apparatus, biometric data indicating one or more biological response measurements in response to the one or more biomechanical movements of the user.

12. The system of claim 11, wherein the processor further performs the biomechanical analysis on the biometric data in addition to the image data.

13. The system of claim 1, wherein the processor further generates a tactile sports feedback cue to be outputted via a tactile output device worn by the user.

14. A computer program product comprising a non-transitory computer readable medium having a computer readable program stored thereon, wherein the computer readable program when executed on a computer causes the computer to:
- receive, through a network from a biomechanical data ingestion apparatus, image data corresponding to one or more biomechanical movements of a user, the receiver being remotely situated from the biomechanical ingestion apparatus;
- perform, with a processor, a biomechanical analysis, via a biomechanical rules engine, of the image data to determine that the one or more biomechanical movements of the user lack compliance with one or more biomechanical rules;
- generate, with the processor, a virtual sports feedback cue to be rendered, in at least substantially real-time, via a virtual sports performance expert during performance of the one or more biomechanical movements of the user, the biomechanical rules comprising a biomechanical angular threshold for an anatomical joint of the user; and
- transmits, via a transmitter, the virtual sports feedback cue to the biomechanical data ingestion apparatus so that a rendering apparatus renders the virtual sports performance expert performing the virtual sports feedback cue in a manner visible to the user during the one or more biomechanical movements.

15. A system comprising:
- an image capture device that captures image data corresponding to one or more biomechanical movements of a user;
- a processor that generates a virtual sports performance expert, the processor further generating a virtual sports feedback cue performed by the virtual sports performance expert based on a determination that the one or more biomechanical movements of the user lack compliance with one or more biomechanical rules, the biomechanical rules comprising a biomechanical angular threshold for an anatomical joint of the user; and
- a rendering apparatus that renders, in at least substantially real-time, the virtual sports performance expert performing the virtual sports feedback cue in a manner visible to the user during the one or more biomechanical movements.

16. The system of claim 15, wherein the rendering apparatus is an augmented reality device.

17. The system of claim 15, wherein the rendering apparatus is a holographic projector.

18. The system of claim 15, wherein the rendering apparatus is a display device, the display device being selected from the group consisting of: a television, a smartphone, a tablet device, and a smartwatch.

19. The system of claim 15, wherein the processor further generates a tactile sports feedback cue.

20. The system of claim 15, further comprising a tactile output device worn by the user, the tactile output device outputting the tactile sports feedback cue.

* * * * *